(12) United States Patent
Nakashima et al.

(10) Patent No.: US 12,533,799 B2
(45) Date of Patent: Jan. 27, 2026

(54) ROBOT, GRIPPING FORCE CONTROL DEVICE, GRIPPING FORCE CONTROL METHOD, AND RECORDING MEDIUM STORING GRIPPING FORCE CONTROL PROGRAM

(71) Applicant: OMRON Corporation, Kyoto (JP)

(72) Inventors: Chisato Nakashima, Kyoto (JP); Misato Nabeto, Kyoto (JP)

(73) Assignee: OMRON Corporation, Kyoto (JP)

( * ) Notice: Subject to any disclaimer, the term of this patent is extended or adjusted under 35 U.S.C. 154(b) by 278 days.

(21) Appl. No.: 18/039,961

(22) PCT Filed: Sep. 14, 2021

(86) PCT No.: PCT/JP2021/033769
§ 371 (c)(1),
(2) Date: Jun. 1, 2023

(87) PCT Pub. No.: WO2022/123849
PCT Pub. Date: Jun. 16, 2022

(65) Prior Publication Data
US 2024/0001540 A1 Jan. 4, 2024

(30) Foreign Application Priority Data
Dec. 8, 2020 (JP) .................. 2020-203481

(51) Int. Cl.
*B25J 13/08* (2006.01)
*B25J 9/16* (2006.01)
*B25J 15/08* (2006.01)

(52) U.S. Cl.
CPC ........... *B25J 9/1612* (2013.01); *B25J 9/1633* (2013.01); *B25J 9/1653* (2013.01); *B25J 13/084* (2013.01); *B25J 15/08* (2013.01)

(58) Field of Classification Search
CPC ...... B25J 9/1612; B25J 9/1653; B25J 9/1633; B25J 13/084; B25J 15/08; G05B 2219/39528; G05B 2219/39532
See application file for complete search history.

(56) References Cited

U.S. PATENT DOCUMENTS

2011/0156416 A1    6/2011   Kawanami et al.
2014/0028118 A1    1/2014   Sakano
(Continued)

FOREIGN PATENT DOCUMENTS

JP    2011-131341 A    7/2011
JP    2014-024134 A    2/2014
(Continued)

OTHER PUBLICATIONS

International Search Report issued in corresponding International Patent Application No. PCT/JP2021/033769 dated Nov. 2, 2021.
(Continued)

*Primary Examiner* — Dalena Tran
(74) *Attorney, Agent, or Firm* — Morgan, Lewis & Bockius LLP

(57) ABSTRACT

This robot comprises: a finger that grips a workpiece; a motor that drives the finger; a driving current detection unit that detects a driving current of the motor; a gripper including a tactile sensor provided in the finger; a driving force calculation unit that calculates a driving force applied to the workpiece by the finger on the basis of a driving current value of the motor; a pressing force calculation unit that calculates a pressing force that the tactile sensor receives from the workpiece on the basis of a detection value of the tactile sensor; and a control unit that determines which of the driving force and the pressing force is to be used on the basis of a gripping force setting value that is a setting value of the gripping force applied to the workpiece by the finger and (Continued)

controls the gripping force using the value of the driving force or the pressing force which is determined to be used.

16 Claims, 13 Drawing Sheets

(56) References Cited

U.S. PATENT DOCUMENTS

| | | | |
|---|---|---|---|
| 2014/0156066 A1 | 6/2014 | Sakano | |
| 2016/0221193 A1 | 8/2016 | Sato | |
| 2019/0308333 A1 | 10/2019 | Chen et al. | |
| 2020/0306995 A1* | 10/2020 | Yerazunis | B25J 15/0009 |
| 2022/0048717 A1* | 2/2022 | Sullivan | B25J 15/10 |
| 2022/0164030 A1* | 5/2022 | Zheng | A63F 13/24 |

FOREIGN PATENT DOCUMENTS

| | | |
|---|---|---|
| JP | 2014-108466 A | 6/2014 |
| JP | 2016-022557 A | 2/2016 |
| JP | 2016-144861 A | 8/2016 |
| JP | 2019-098406 A | 6/2019 |
| JP | 2019-200189 A | 11/2019 |

OTHER PUBLICATIONS

Written Opinion issued in corresponding International Patent Application No. PCT/JP2021/033769 dated Nov. 2, 2021.
Bélanger-Barrette, "Tactile Sensors for Robot Grippers", Current Articles, The Wayback Machine, URL:https://web.archive.org/web/20140702070306/https://blog.robotiq.com/bid/70987/tactile-sensors-for-robot-grippers, 2014, pp. 1-2.
Extended European Search Report issued in corresponding European Patent Application No. 21902953.5, dated Feb. 13, 2025.

* cited by examiner

ROBOT, GRIPPING FORCE CONTROL DEVICE, GRIPPING FORCE CONTROL METHOD, AND RECORDING MEDIUM STORING GRIPPING FORCE CONTROL PROGRAM

TECHNICAL FIELD

The present disclosure relates to a robot, a gripping force control device, a gripping force control method, and a gripping force control program.

BACKGROUND ART

When controlling an electrical gripper attached to a hand of a robot, there is a need to set and control an appropriate gripping force to manipulate a manipulation target.

For example, a robot control device disclosed in Patent Document 1 controls a gripping force of a robot hand based on a supply current supplied to a motor for driving a claw to grip an object.

Moreover, a device disclosed in Patent Document 2 controls a gripping force of a robot hand based on pressure detected by a pressure sensor module provided on a gripping side of a manipulator portion of a robot hand for gripping a workpiece W.

For electrical grippers having a settable gripping force, in practice the gripping force is not settable across the entire range and is instead settable at from 30% to 40% of the rated value and above, with it being difficult to control the electrical grippers at a weak force. This means that there is a need to use different grippers in cases in which there are different ranges of gripping force needed in plural production steps.

The reason a weak gripping force is not able to be controlled is due to not being able to obtain the detection precision and controllability needed for speedily picking up changes to gripping force of a gripper. More specifically, in order to compute the current gripping force, there is a need to detect the current in an inbuilt motor of the gripper and find the torque thereof, but resolution of an analogue-to-digital converter (ADC) for current detection is low, and so the required detection precision is not obtainable. Moreover, in order to suppress rapid fluctuations in the gripping force of a gripper, there is a need to pick up a change in the gripping force as fast as possible and employ a short control cycle for feedback control to adjust output values, however it is difficult to achieve such a short control cycle.

Patent Document 1: Japanese Patent Application Laid-Open (JP-A) No. 2019-98406
Patent Document 2: JP-A No. 2019-200189

SUMMARY OF INVENTION

Technical Problem

In consideration of the above circumstances, an object of the present disclosure is to provide a robot, a gripping force control device, a gripping force control method, and a gripping force control program capable of controlling gripping force of a gripper exactly, even in a region of small gripping force.

Solution to Problem

A first aspect of the disclosure is a robot including a gripper, a drive force computation section, a pressing force computation section, and a control section. The gripper includes plural fingers that grip a target object, a motor that drives at least one finger from out of the plural fingers as a drive finger, a drive current detection section that detects a drive current of the motor, and a tactile sensor that is provided to at least one finger from out of the plural fingers as a tactile finger. The drive force computation section computes a drive force that the drive finger is imparting to the target object based on a drive current value of the motor as detected by the drive current detection section. The pressing force computation section computes a pressing force the tactile sensor is receiving from the target object based on a detection value of the tactile sensor. The control section determines which to employ from out of the drive force or the pressing force based on a set gripping force value that is a setting value of gripping force the drive finger or the tactile finger is to impart to the target object, and that controls the gripping force employing a value of whichever was determined to be employed from out of the drive force or the pressing force.

A second aspect of the disclosure is a gripping force control device connected to a gripper of a robot that includes plural fingers that grip a target object, a motor that drives at least one finger from out of the plural fingers as a drive finger, a drive current detection section that detects a drive current of the motor, and a tactile sensor that is provided to at least one finger from out of the plural fingers as a tactile finger. The gripping force control device controls a gripping force imparted to the target object by the drive finger or the tactile finger and includes a drive force computation section, a pressing force computation section, and a control section. The drive force computation section computes a drive force being imparted to the target object by the drive finger based on a drive current value of the motor as detected by the drive current detection section. The pressing force computation section computes a pressing force the tactile sensor is receiving from the target object based on a detection value of the tactile sensor. The control section determines which to employ from out of the drive force or the pressing force based on a set gripping force value that is a setting value of the gripping force, and controls the gripping force employing a value of whichever was determined to be employed from out of the drive force or the pressing force.

In the second aspect, a force anticipated in design as a force for the drive finger to impart to the target object when an instructed current value of a given value has been issued and the motor driven is taken as an instructed drive force, a magnitude of a difference between the drive force computed based on the detected drive current value and the instructed drive force is taken as a first error, and a magnitude of a difference between a reaction force corresponding to the computed pressing force and the instructed drive force is taken as a second error. To control the gripping force the control section may determine to employ the drive force or the pressing force that corresponds to a smallest error from out of the first error or the second error when the instructed drive force is made the set gripping force value.

In the second aspect, the instructed drive force at which a magnitude relationship between the first error and the second error switches may be taken as a switch value, and the control section may control the gripping force by employing a value of whichever of the drive force or the pressing force corresponds to a smaller error from out of the first error and the second error as identified by the set gripping force value being larger or smaller than the switch value.

In the second aspect, the control section may move the drive finger by controlling a position of the drive finger until the plural fingers are at positions just ahead of gripping the target object, and then control so as to move the drive finger until a magnitude of the drive force or the pressing force being employed to control the gripping force has become the set gripping force value.

In the second aspect, the control section may control to move the drive finger so as to sequentially pass through a series of stepwise set target positions, and then control so as to move the drive finger until a magnitude of the drive force or the pressing force being employed to control the gripping force becomes the set gripping force value.

In the second aspect, the control section may control by controlling a speed of the drive finger to move the drive finger until the drive finger is detected as contacting the target object, and then control so as to move the drive finger until a magnitude of the drive force or the pressing force being employed to control the gripping force becomes the set gripping force value.

In the second aspect, the control section may control by controlling a position of the drive finger so as to move the drive finger until the plural fingers are at a preparatory action target position just ahead of gripping the target object, and then control so as to move the drive finger to within a target range or to move the drive finger until a magnitude of the drive force or the pressing force being employed to control the gripping force has become the set gripping force value.

In the second aspect, the control section may drive the drive finger between an open state and a closed state of the plural fingers, acquire time series of a position of the gripper, the drive force, and the pressing force, and notify when a difference between the drive force and the pressing force is outside a permissible range.

In the second aspect, the control section may drive the drive finger between an open state and a closed state of the plural fingers, acquire the pressing force as a time series, and notify in cases in which a difference between the acquired pressing force and the pressing force acquired in the past is outside a permissible range.

In the second aspect, the gripper may include a gripper product with a defined specification of gripping force range, with the gripper product being equipped with the plural fingers, the motor, and the drive current detection section, and the control section may acquire a lower limit value of the gripping force range in the specification of the gripper product, and notify in cases in which the control section is not able to acquire a detection value of the tactile sensor, which should rise due to the plural fingers being closed when the drive finger has been driven at less than the lower limit value of the gripping force range in the specification of the gripper product in a closed state of the plural fingers.

In the second aspect, the gripper may include a gripper product with a defined specification of gripping force range, with the gripper product being equipped with the plural fingers, the motor, and the drive current detection section, the tactile sensor may be configured with a defined specification of minimum detection value that is detectable, and the control section may acquire a lower limit value of the gripping force range in the specification of the gripper product and a minimum detection value in the specification of the tactile sensor, and notify in cases in which the pressing force corresponding to the minimum detection value is the lower limit value of the gripping force range in the specification of the gripper product or greater.

A third aspect of the disclosure is a gripping force control method in a gripping force control device connected to a gripper of a robot that includes plural fingers that grip a target object, a motor that drives at least one finger from out of the plural fingers as a drive finger, a drive current detection section that detects a drive current of the motor, and a tactile sensor that is provided to at least one finger from out of the plural fingers as a tactile finger, and that controls a gripping force imparted to the target object by the drive finger or the tactile finger. The gripping force control method includes computing a drive force the drive finger is imparting to the target object based on a drive current value of the motor as detected by the drive current detection section, computing a pressing force the tactile sensor is receiving from the target object based on a detection value of the tactile sensor, determining which to employ from out of the drive force or the pressing force based on a set gripping force value that is a setting value of the gripping force, and controlling the gripping force employing a value of whichever was determined to be employed out of the drive force or the pressing force.

A fourth aspect of the disclosure is a gripping force control program in a gripping force control device connected to a gripper of a robot that includes plural fingers that grip a target object, a motor that drives at least one finger from out of the plural fingers as a drive finger, a drive current detection section that detects a drive current of the motor, and a tactile sensor that is provided to at least one finger from out of the plural fingers as a tactile finger, and that controls a gripping force imparted to the target object by the drive finger or the tactile finger. The gripping force control program causes a computer to execute processing including computing a drive force the drive finger is imparting to the target object based on a drive current value of the motor as detected by the drive current detection section, computing a pressing force the tactile sensor is receiving from the target object based on a detection value of the tactile sensor, determining which to employ from out of the drive force or the pressing force based on a set gripping force value that is a setting value of the gripping force, and controlling the gripping force employing a value of whichever was determined to be employed out of the drive force or the pressing force.

The present disclosure enables exact control of gripping force of a gripper even in a region of small gripping force.

DESCRIPTION OF EMBODIMENTS

Figure 1:
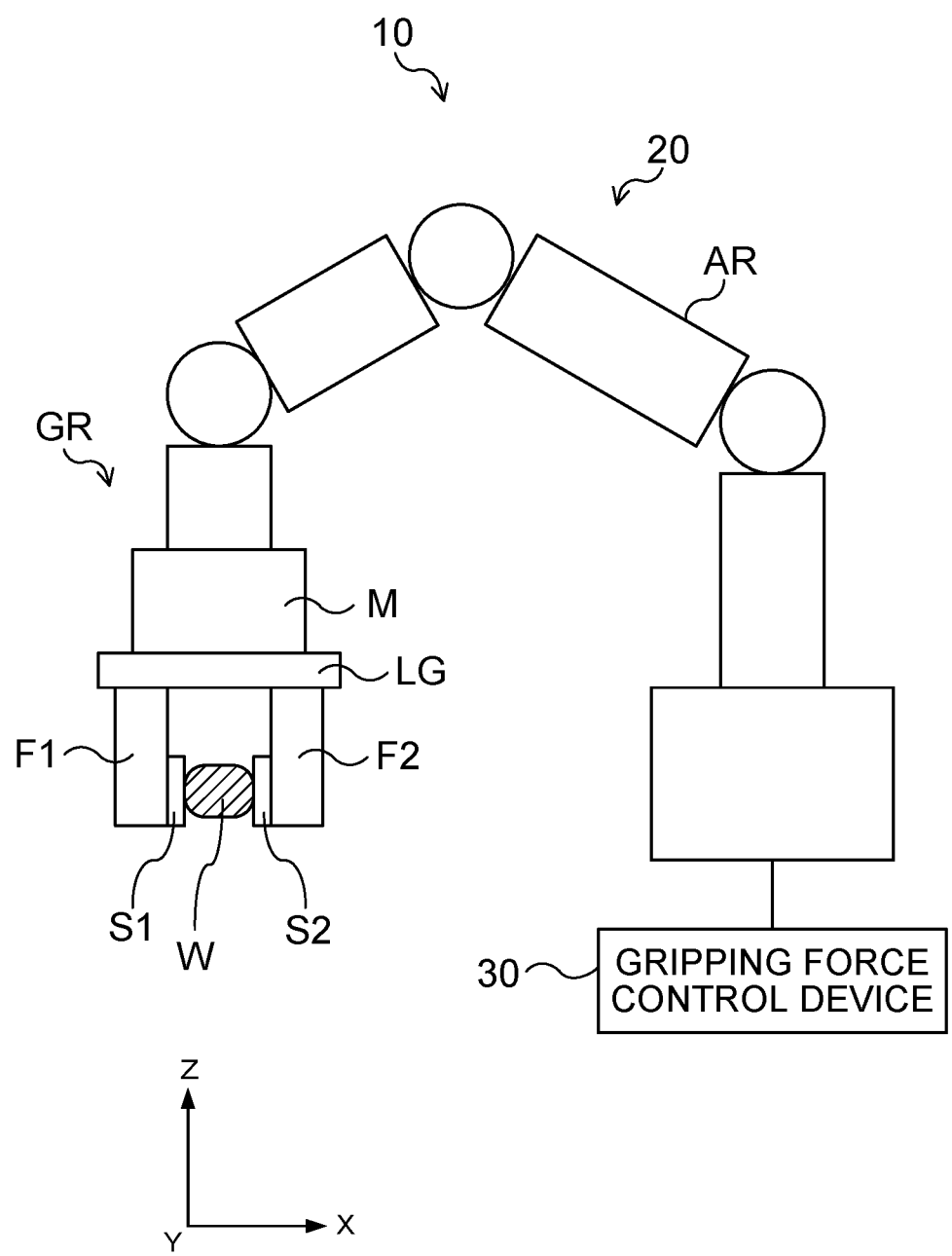
FIG. 1 is a configuration diagram of a robot system.

Description follows regarding examples of exemplary embodiments of the present disclosure, with reference to the drawings. Note that the same reference numerals will be appended to the same or equivalent configuration elements and parts in each of the drawings. Moreover, for ease of explanation, the dimensional ratios in the drawings are sometimes exaggerated, and sometimes differ from actual ratios.

First Exemplary Embodiment

FIG. 1 is a configured of a robot system 10 according to a first exemplary embodiment. As illustrated in FIG. 1, the robot system 10 includes a robot 20, and a gripping force control device 30. In the present exemplary embodiment the robot system 10 functions as a picking device for picking workpieces.

The robot 20 includes a robot arm AR, and a gripper GR attached to a distal end of the robot arm AR, as functional sections that are the targets of motion control when performing a picking action.

The gripper GR includes two fingers F1, F2 for gripping the workpiece W, serving as an example of a target object. Note that although explanation in the present exemplary embodiment is of a case in which the number of fingers is two, the number of fingers is not limited to being two, and three or more fingers may be provided. Moreover, although the fingers F1, F2 are configured as plate shaped members as an example of the present exemplary embodiment, the shape of the fingers F1, F2 is not limited thereto.

Moreover, the gripper GR includes a motor M to drive at least one finger from out of the fingers F1, F2 as a drive fingers. The motor M is connected to a linear guide LG. The linear guide LG includes a conversion mechanism to convert rotational motion of the motor M into linear motion.

The fingers F1, F2 are attached to the linear guide LG. The linear guide LG is driven by the motor M, and converts rotational motion of the motor M having a rotation axis along an Z axis into a linear motion along an X axis direction.

More specifically, for example in cases in which the motor M is rotated in a forward direction, the linear guide LG drives the fingers F1, F2 in a closing direction, namely in a direction to grip the workpiece W. However, when the motor M is rotated in the reverse direction, the linear guide LG drives the fingers F1, F2 in an opening direction, namely in a direction to release the workpiece W. Note that although in the present exemplary embodiment explanation is given for an example of a configuration in which the fingers F1, F2 are both driven at the same time when the motor M is rotated, a configuration may be adopted in which only one finger from out of the fingers F1, F2 is driven. Namely, although in the present exemplary embodiment explanation is given of cases in which the drive fingers are both of the fingers F1, F2, the drive finger may be only one out of the fingers F1, F2.

Figure 2:
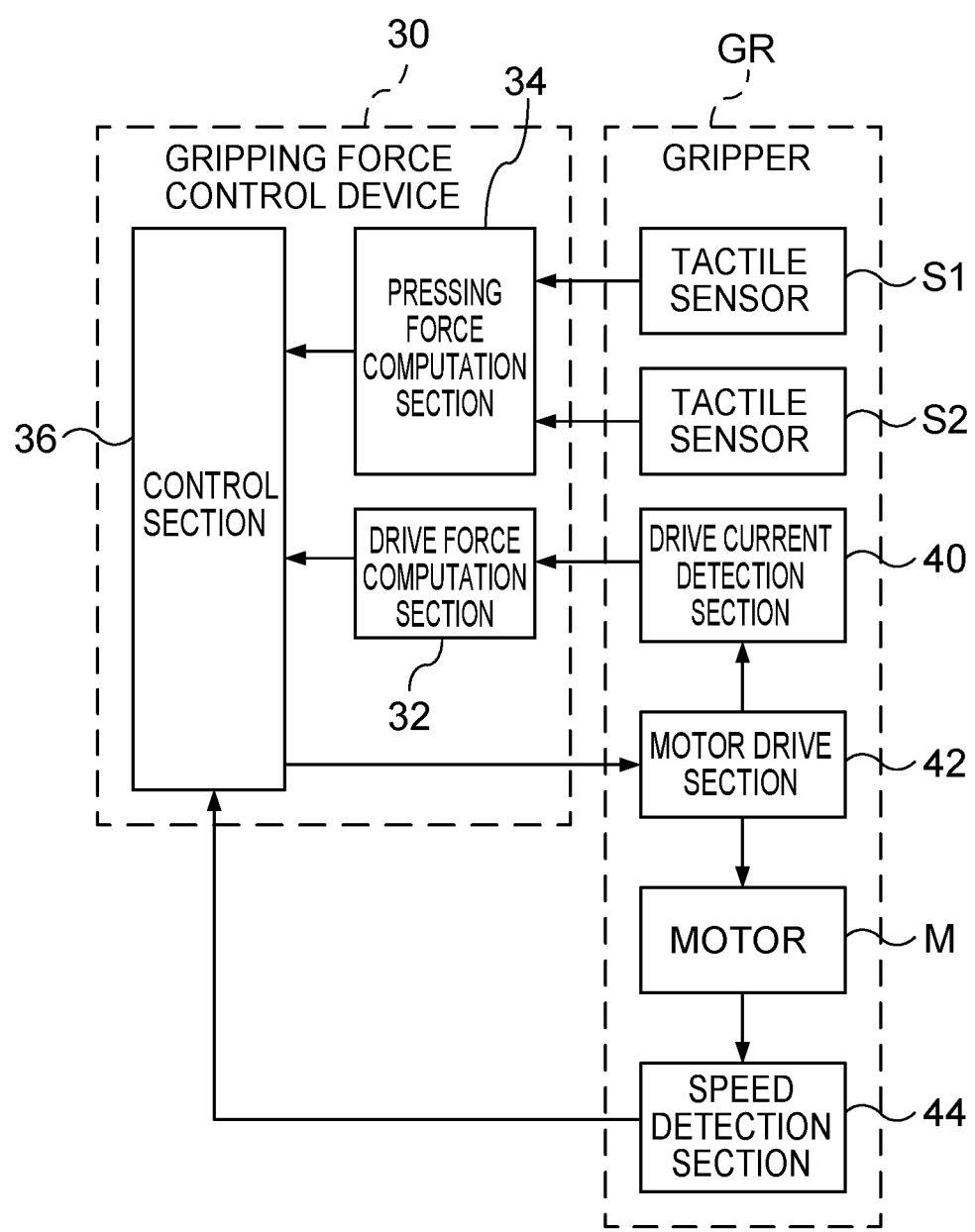
FIG. 2 is a functional block diagram of a gripping force control device.

Moreover, the gripper GR includes a drive current detection section 40 to detect a drive current of the motor M, a motor drive section 42 to drive the motor M, and a speed detection section 44 to detect a speed of the motor M (see FIG. 2). Based on an output value of a non-illustrated encoder provided to the motor M, the speed detection section 44 detects a position, speed, and acceleration of the fingers F1, F2, and outputs these to the gripping force control device 30.

Note that a gripper product having a specification with a defined gripping force range is employed as the gripper GR in the present exemplary embodiment. This gripper product includes fingers F1, F2, the motor M, and the drive current detection section. In practice the settable gripping force of the gripper, for which a gripping force is able to be set, is not across the entire rated value range, and is instead a specification of gripping force range at from 30% to 40% of the rated value and above. Thus, for example, in cases in which a gripper product has a rated value of 100 N, then the gripping force range specification is, for example, a lower limit value of 40 N and an upper limit value of 100 N.

Moreover, tactile sensors S1, S2 are provided to respective gripping surfaces of the fingers F1, F2. These tactile sensors S1, S2 detect pressing force received by the tactile sensors S1, S2 from the workpiece W when the fingers F1, F2 have gripped the workpiece W. The tactile sensors S1, S2 may be incorporated in the gripper product, and may be attached later thereto and not incorporated in the gripper product.

Note that the present exemplary embodiment will be described for a case in which the tactile sensors S1, S2 are tactile sensors having the same specification as each other. Moreover, although the present exemplary embodiment is described for a configuration having tactile sensors provided to both the fingers F1, F2, namely a case in which both the fingers F1, F2 are tactile fingers, a configuration may be adopted in which the tactile sensor is only provided to one out of the fingers F1, F2. Moreover, the tactile sensors S1, S2 have a specification in which a minimum detection value of detectable pressing force is defined. The tactile sensors S1, S2 employed have a minimum detection value of detectable pressing force smaller than a lower limit value of the gripping force range of the gripper product, and have a maximum detection value of detectable pressing force that is the lower limit value of the gripping force range of the gripper product or greater. For example, in cases in which the lower limit value of the gripping force range of the gripper product is 40 N, then tactile sensors S1, S2 having a detectable pressing force range of, for example, from 1 N to 100 N are employed therefor.

The pressing force referred to here is a reaction force to the gripping force, and has the same magnitude and opposite direction to the gripping force. The gripping force is a force imparted to the workpiece W by the drive finger or the tactile finger. Note that in the present exemplary embodiment, in cases in which the fingers F1, F2 directly contact each other without gripping a workpiece W and force is imparted from one finger to the other, the force imparted to the other finger is called a gripping force. Moreover, although the gripping force is generated for each of the fingers F1, F2, the gripping forces of the fingers F1, F2 are taken as being of the same magnitude and opposite direction to each other when the influence of gravity is not considered.

Figure 3:
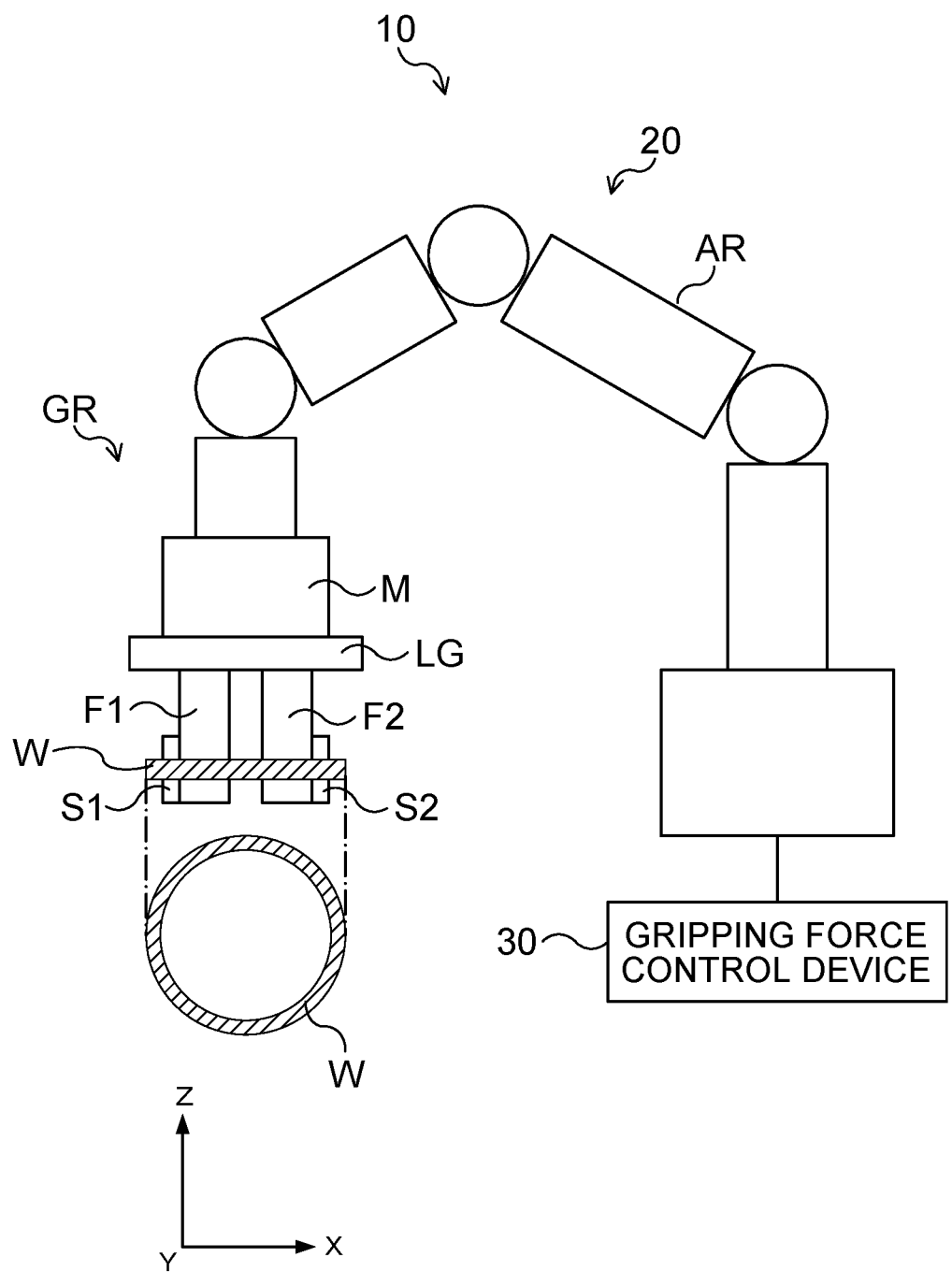
FIG. 3 is a diagram to explain another example of gripping a workpiece.

Moreover, although in FIG. 1 the tactile sensors S1, S2 are illustrated as being configured provided on side faces where the fingers F1, F2 oppose each other, there is no limitation thereto. For example, as illustrated in FIG. 3, a configuration may be adopted in which the tactile sensors S1, S2 are provided to faces on the opposite side of the fingers F1, F2 to their opposing faces. In such cases, as illustrated in FIG. 3, a pressing force based on detection values of the tactile sensors S1, S2 can also be detected for cases in which a ring shaped workpiece W is gripped by inserting the fingers F1, F2 into a hole in the ring shaped workpiece W and then driving so as to open the fingers F1, F2.

The robot 20 employed is, as an example, a vertical articulated robot, horizontal articulated robot, or the like having six degrees of freedom, however the number of degrees of freedom and type of robot are not limited thereto.

The gripping force control device 30 controls the robot 20. As illustrated in FIG. 2, the gripping force control device 30 includes, from a functional perspective, a drive force computation section 32, a pressing force computation section 34, and a control section 36.

The drive force computation section 32 computes a drive force Pi imparted by the fingers F1, F2, which are drive fingers, to the workpiece W based on a drive current value Ec of the motor M as detected by the drive current detection section 40. The drive force Pi is, for example, computed using the following equation.

$$Pi = Ec \times Tr \times K \qquad \text{Equation (1)}.$$

Wherein Tr is a torque constant and K is a conversion factor, with each set to a predetermined value.

The pressing force computation section 34 multiplies the respective detection values of the tactile sensors S1, S2 provided to the fingers F1, F2, which are tactile fingers, by the predetermined conversion factor, so as to compute pressing forces P1, P2 received by the tactile sensors S1, S2 from the workpiece W. An adjustment pressing force Ps can be computed using the following equation.

$$Ps = (P1 + P2)/2 \qquad \text{Equation (2)}$$

Note that although in the present exemplary embodiment the adjustment pressing force Ps is employed for control, a pressing force P1 may be employed in control for cases in which, for example, the tactile sensor S1 is provided to the finger F1 but the tactile sensor S2 is not provided to the finger F2. In the present exemplary embodiment the adjustment pressing force Ps is also simply called pressing force Ps. In cases in which the tactile sensor S1 is configured by plural pressure sensors, a value resulting from taking a total value of the detection values detected by each of the pressure sensors and multiplying this by the conversion factor is taken as the pressing force P1. Similar applies to the tactile sensor S2.

Moreover, sometimes one finger from out of the fingers F1, F2 contacts the workpiece W until gripping of the workpiece W by the fingers F1, F2 is complete. This means that temporarily a large pressing force acts on the tactile sensor provided to the finger that first contacts the workpiece W for a duration until gripping of the workpiece W is complete, however gripping force control should not be performed based on this temporary large pressing force. Moreover, in cases in which there is a desire to grip the workpiece W delicately using a small force, then were gripping force control to be performed based on the temporary large pressing force there would be a concern that a restriction to the gripping force would not function, leading to the workpiece W being damaged.

Thus the pressing force Ps may be taken as being the smaller value from out of the pressing forces P1, P2 of the tactile sensors S1, S2, and when the pressing forces P1, P2 are the same value as each other, the pressing force Ps may be taken as being this value.

Based on a set gripping force value, which is a setting value of gripping force for a drive finger or the tactile finger to impart to the workpiece W, the control section 36 determines which to employ from out of the drive force or the pressing force, and controls the gripping force by employing the value of the drive force or the pressing force that was thereby determined to be employed.

More specifically, a force anticipated in design as a force to be imparted by the drive finger to the workpiece W when the motor M has been driven by an instructed current value of a given value is taken as being an instructed drive force, a magnitude of a difference between the drive force computed by the drive force computation section 32 based on the drive current value as detected by the drive current detection section 40 and the instructed drive force is taken as being a first error, and a magnitude of a difference in between a reaction force corresponding to the pressing force computed by the pressing force computation section 34 and the instructed drive force is taken as being a second error. To control the gripping force in this scenario, the control section 36 determines to employ the drive force or the pressing force that corresponds to the smallest error from out of the first error or the second error such that the instructed drive force becomes the set gripping force value.

More specifically, when an instructed drive force at which a magnitude relationship between the first error and the second error switches is taken as a switch value, the control section 36 controls the gripping force employing the value of the drive force or the pressing force corresponding to the smaller error from out of the first error or the second error as determined by whether the set gripping force value is greater or smaller than the switch value.

Moreover, the control section 36 moves the fingers F1, F2 to a position just ahead of where the fingers F1, F2 would grip the workpiece W by controlling the position of the fingers F1, F2, and then controls so as to move the fingers F1, F2 until a magnitude of the drive force or the pressing force employed to control the gripping force becomes the set gripping force value.

Next, a block diagram illustrating a hardware configuration of the gripping force control device 30.

Figure 4:
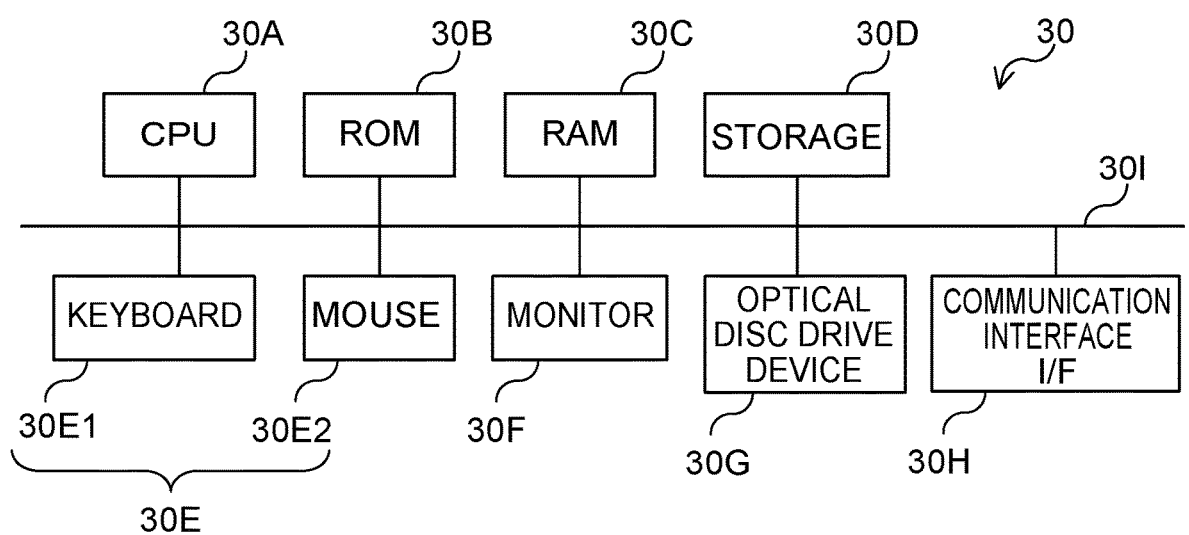
FIG. 4 is a block diagram illustrating a hardware configuration of a gripping force control device.

As illustrated in FIG. 4, the gripping force control device 30 includes a central processing unit (CPU) 30A, read only memory (ROM) 30B, random access memory (RAM) 30C, storage 30D, an input section 30E, a monitor 30F, an optical disc drive device 30G, and a communication interface 30H. Each configuration is connected together through a bus 301 so as to be capable of communicating with each other.

In the present exemplary embodiment a gripping force control program is stored in the storage 30D. The CPU 30A is a central processing unit that executes various programs and controls each section. Namely, the CPU 30A reads a program from the storage 30D, and executes the program using the RAM 30C as workspace. The CPU 30A controls each of the above configurations and performs various computation processing according to the program recorded in the storage 30D.

Various programs and various data are stored on the ROM 30B. The RAM 30C serves as a workspace to temporarily store programs or data. The storage 30D is configured by a hard disk drive (HDD) or solid state drive (SSD), and is stored with various programs including an operating system and various data.

The input section 30E includes a keyboard 30E1, and a pointing device such as a mouse 30E2 or the like, and is employed to perform various inputs. The monitor 30F is, for example, a liquid crystal display, and displays various information such as a gripped state of the workpiece W or the like. The monitor 30F may also function as the input section 30E by employing a touch panel therefor. The optical disc drive device 30G performs reading of data stored on various recording media (CD-ROM, Blu-ray disc, or the like), and writing of data to the recording media.

The communication interface 30H is an interface for performing communication with external devices, and employs a standard such as, for example, Ethernet (registered trademark), FDDI, or Wi-Fi (registered trademark).

Each of the functional configuration of the gripping force control device 30 illustrated in FIG. 2 is implemented by the CPU 30A reading the gripping force control program stored on the storage 30D, and expanding and executing the gripping force control program in the RAM 30C.

Next, description follows regarding operation of the gripping force control device 30.

Figure 5:
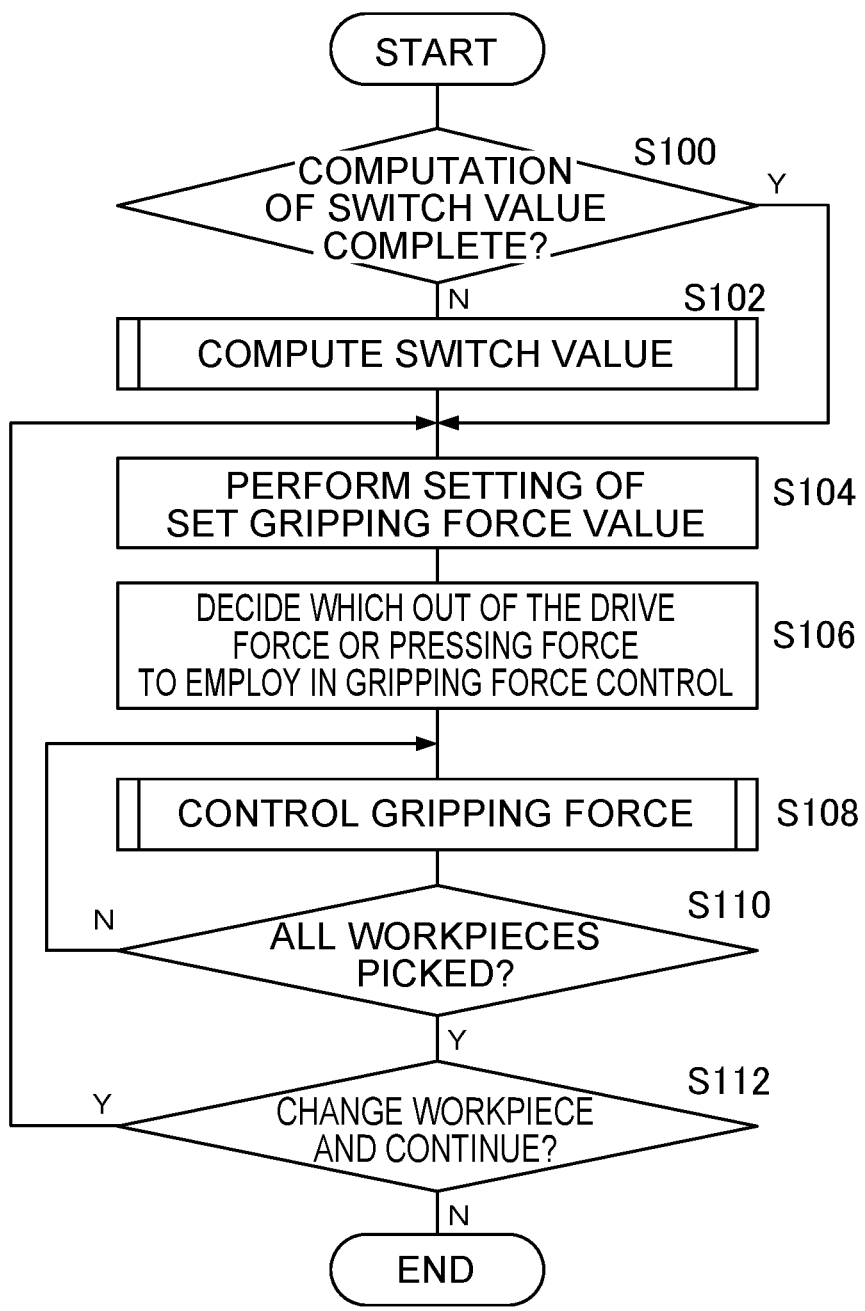
FIG. 5 is a flowchart illustrating a flow of a main routine of gripping force control processing according to a first exemplary embodiment.

FIG. 5 is a flowchart illustrating a flow of the gripping force control processing by the gripping force control device 30. When instructed to execute gripping force control processing by a user operating the input section 30E, the gripping force control processing is executed by the CPU 30A reading the gripping force control program from the storage 30D, and expanding and executing the gripping force control program in the RAM 30C.

At step S100, the CPU 30A operates as the control section 36 to determine whether or not computation of the switch value is complete. Processing transitions to step S102 in cases in which computation of the switch value is not complete, and processing transitions to step S104 in cases in which computation of the switch value is complete.

Figure 6:
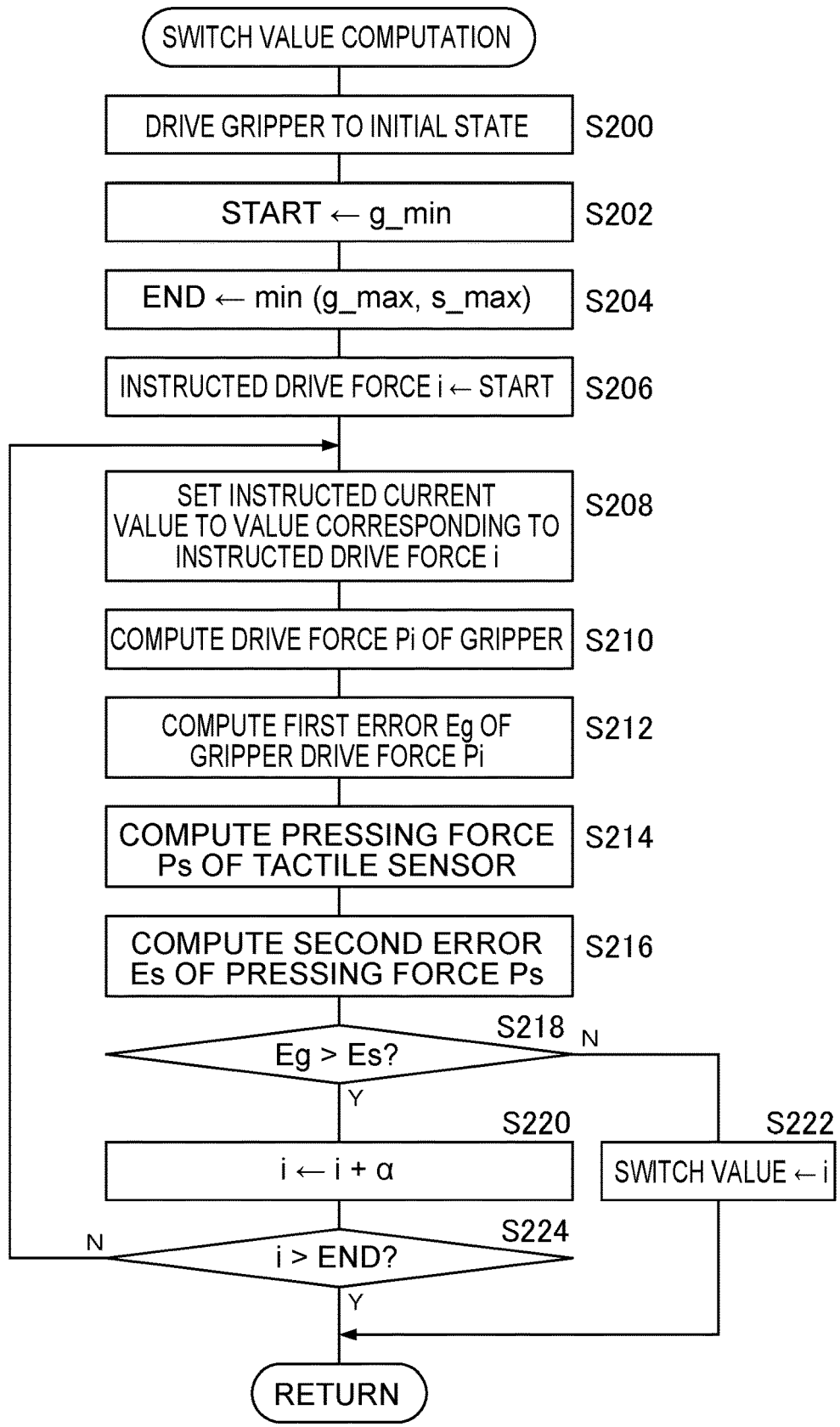
FIG. 6 is a flowchart illustrating a flow of switch value computation processing.

At step S102, the CPU 30A operates as the control section 36, and executes the switch value computation processing illustrated in FIG. 6. The switch value is determined according to characteristics of the gripper GR and the tactile sensors S1, S2, and while the gripper GR and the tactile sensors S1, S2 are being employed as the target for switch value computation, the same value can continue to be employed for the switch value even in cases in which the set gripping force value is changed to perform a different task, such as gripping a different type of workpiece W, and step S104 onward are being re-executed.

At step S104, the CPU 30A operates as the control section 36 to set the set gripping force value. The set gripping force value is set according to the type of the workpiece W. For example, a data table expressing correspondence relationships between workpiece W types and set gripping force values may be stored in advance in the storage 30D, such that the set gripping force value is automatically set with reference to the data table in response to an instruction of the workpiece W type, or the set gripping force value may be directly instructed by an operator.

At step S106, the CPU 30A operates as the control section 36 and, based on the set gripping force value set at step S104 and the switch value, determines which to employ in gripping force control from out of the drive force Pi or the pressing force Ps. More specifically, determination is to employ the drive force Pi in cases in which the set gripping force value is the switch value or greater, and determination is to employ the pressing force Ps in cases in which the set gripping force value is less than the switch value. When such determination has been made, the control section 36 employs the drive force Pi or the pressing force Ps corresponding to the smaller error from out of the first error or the second error to control the gripping force such that the instructed drive force becomes the set gripping force value.

Figure 7:
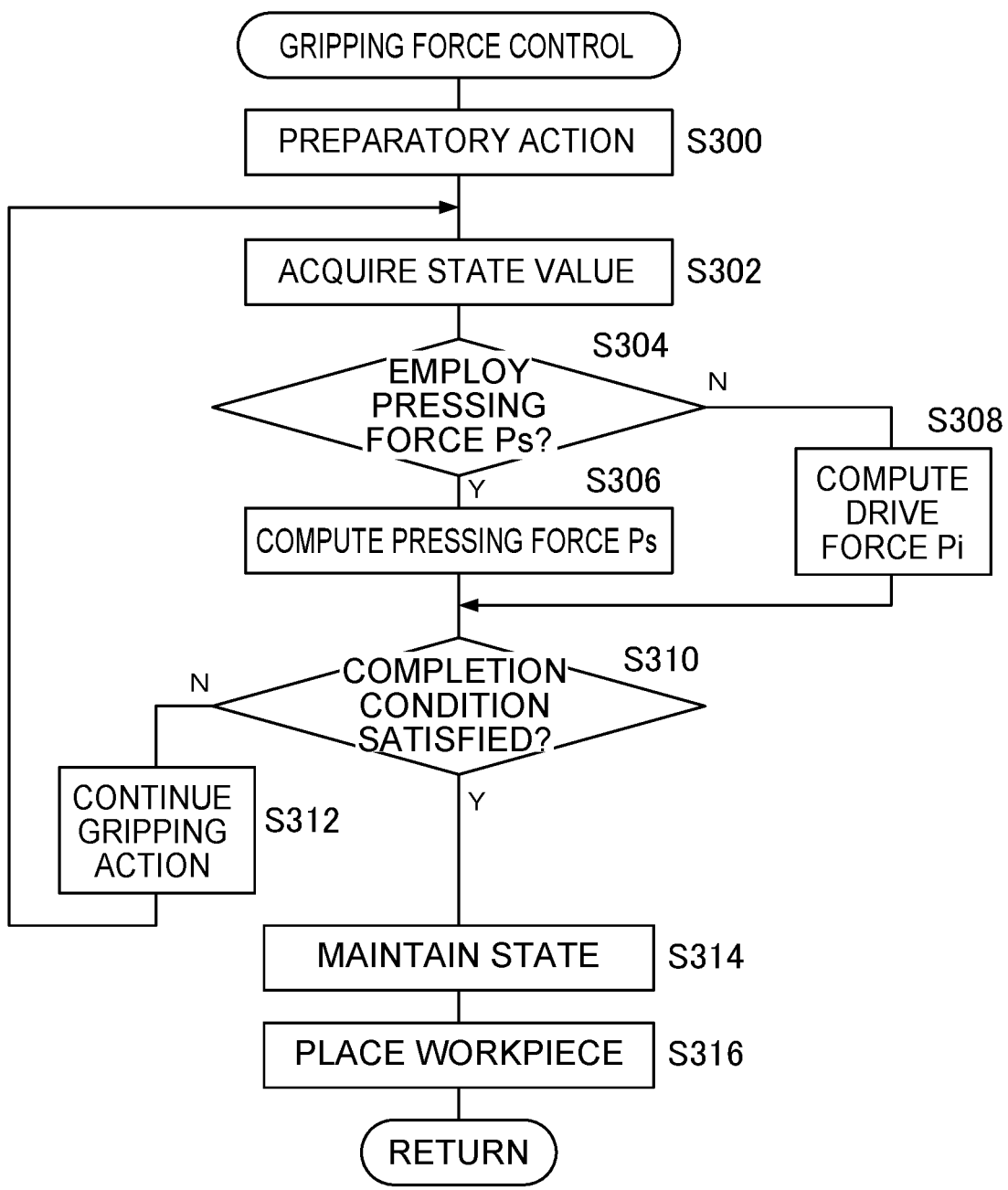
FIG. 7 is a flowchart illustrating a flow of gripping force control processing.

At step S108, the CPU 30A operates as the control section 36 and executes the gripping force control illustrated in FIG. 7.

At step S110, the CPU 30A operates as the control section 36 and determines whether or not all workpieces W have been picked. Processing then transitions to step S112 when all the workpieces W have been picked. However, processing transitions to step S108 in cases in which not all of the workpieces W have been picked, and gripping force control is repeated.

At step S112, the CPU 30A operates as the control section 36 and determines whether or not to change the workpiece W and continue. The processing then, for example, transitions to step S104 in cases in which an operator has instructed to change the workpiece W and continues, and the present routine is ended in cases in which the operator has instructed to end without changing the workpiece W.

Description follows regarding switch value computation processing, with reference to FIG. 6.

At step S200, the CPU 30A operates as the control section 36 and controls the motor drive section 42 such that the gripper GR is placed in a predetermined initial state. More specifically, the control section 36 controls the motor drive section 42 such that the fingers F1, F2 close from a non-contact state to a contact state of the fingers F1, F2 at which detection values of the tactile sensors S1, S2 start to rise. Then the motor drive section 42 is controlled so as to open the fingers F1, F2 until the detection values of the tactile sensors S1, S2 become values that can be treated as zero, namely until a state of the fingers F1, F2 is achieved that can be considered to be a non-contact state.

At step S202, the CPU 30A operates as the control section 36 and sets a gripping force initial value Start of the gripper GR to a lower limit value g_min of a gripping force range in the specification of the gripper GR.

At step S204, the CPU 30A operates as the control section 36 and sets a gripping force maximum value End of the gripper GR to value that is the smaller value from out of an upper limit value g max of the gripping force range in the specification of the gripper GR and an upper limit value s max of the detection range in the specification of the tactile sensors S1, S2.

At step S206, the CPU 30A operates as the control section 36 and sets an instructed drive force i to the gripping force initial value Start as set at step S202. The instructed drive force i is a force anticipated in design as a force to be imparted by a drive finger to the workpiece W in cases in which the motor M has been driven by a given value of the instructed current value.

At step S208, the CPU 30A operates as the control section 36 and sets an instructed current value (output torque) of the gripper GR to a value corresponding to the instructed drive force i. Namely, outputs the set instructed current value to the motor drive section 42. The motor drive section 42 thereby drives the motor M at the instructed current value corresponding to the instructed drive force i.

At step S210, the CPU 30A operates as the drive force computation section 32 and computes the drive force Pi of the gripper GR. More specifically, the drive current value Ec of the drive current of the motor M is acquired from the drive current detection section 40. The drive force Pi of the gripper GR is then computed according to above Equation (1).

At step S212, the CPU 30A operates as the control section 36 and computes a first error Eg, which is a magnitude of a difference between the drive force Pi computed at step S210 and the instructed drive force i, according to the following equation.

$$Eg=|i-Pi| \qquad \text{Equation (3).}$$

At step S214, the CPU 30A operates as the pressing force computation section 34 and, based on the detection values of the tactile sensors S1, S2, computes the pressing force Ps received from each other by the tactile sensor S1 (S2) and the tactile sensor S2 (S1), according to Equation (2).

At step S216, the CPU 30A operates as the control section 36 and computes a second error Es, which is a magnitude of a difference between a reaction force corresponding to the pressing force Ps computed at step S214 and the instructed drive force i, according to the following equation.

$$Es=|i-Ps| \qquad \text{Equation (4)}$$

At step S218, the CPU 30A operates as the control section 36, and determines whether or not the first error Eg computed at step S212 is greater than the second error Es computed at step S216. Processing transitions to step S220 in cases in which the first error Eg is greater than a second error Es, and processing transitions to step S222 in cases in which the first error Eg is the second error Es or less. In the present exemplary embodiment the instructed drive force i is gradually increased from initially being the lower limit value g_min of the gripping force range in the specification of the gripper GR, and so the first error Eg is expected to be initially greater than the second error Es.

At step S220, the CPU 30A operates as the control section 36 and updates the instructed drive force i using the following equation.

$$i=i+\alpha \qquad \text{Equation (5)}$$

α is a setting resolution for the drive force of the gripper GR.

At step S224, the CPU 30A operates as the control section 36 and determines whether or not the instructed drive force i is greater than the gripping force maximum value End of the gripper GR. The present routine is ended in cases in which the instructed drive force i is greater than the gripping force maximum value End of the gripper GR. However, processing transitions to step S208 in cases in which the instructed drive force i is the gripping force maximum value End of the gripper GR or less, and the processing of steps S208 to S224 is repeated until the instructed drive force i becomes greater than the gripping force maximum value End of the gripper GR.

At step S222, the CPU 30A operates as the control section 36 and sets the switch value to the current instructed drive force i. Then the present routine is ended.

In this manner, the instructed drive force i is gradually increased while the first error Eg is greater than the second error Es, and the switch value is taken as being the instructed drive force i at the point in time when the first error Eg becomes the second error Es or lower. Namely, the instructed drive force i when the magnitude relationship between the first error Eg and the second error Es switches is taken as being the switch value.

Next, description follows regarding the gripping force control processing, with reference to FIG. 7.

At step S300, the CPU 30A operates as the control section 36 and controls the motor drive section 42 such that the gripper GR performs a preparatory action. More specifically, as illustrated by "position control" of FIG. 8, the fingers F1, F2 are moved to a preparatory action target position that is a position just ahead of where the fingers F1, F2 would grip the workpiece W by controlling the position of the fingers F1, F2. The position just ahead of gripping the workpiece W is, for example, a position where a distance d in the X axis direction of the fingers F1, F2 is a slightly longer distance than the X axis direction length of the workpiece W, namely, where the fingers F1, F2 are positioned ahead of contacting the workpiece W.

At step S302, a state value of the gripper GR is acquired. The state value includes a current position and speed of the fingers F1, F2, a drive current value of the motor M, detection values of the tactile sensors S1, S2, and the like.

At step S304, the CPU 30A determines whether or not the force to employ in gripping force control is the pressing force Ps, namely, determines whether or not the force determined at step S106 of FIG. 5 is the pressing force Ps. The processing then transitions to step S306 in cases in which the force to employ in gripping force control is the pressing force Ps, and the processing transitions to step S308 in cases in which the force determined at step S106 of FIG. 5 is not the pressing force Ps, namely, the force determined at step S106 of FIG. 5 is the drive force Pi.

At step S306, the pressing force Ps is computed according to above Equation (2) based on the detection values of the tactile sensors S1, S2 acquired at step S302.

At step S308, the drive force Pi is computed by above Equation (1) based on the drive current value of the motor M as acquired at step S302.

At step S310 determination is made as to whether or not a predetermined completion condition is satisfied. The completion condition is, for example, that the pressing force Ps computed at step S306 has become the set gripping force value for cases in which the pressing force Ps is being employed in gripping force control, and is that the drive force Pi computed at step S308 has become the set gripping force value for cases in which the drive force Pi is being employed in gripping force control.

Processing transitions to step S312 in cases in which the predetermined completion condition has not been satisfied, and processing transitions to step S314 in cases in which the predetermined completion condition has been satisfied.

Figure 8:
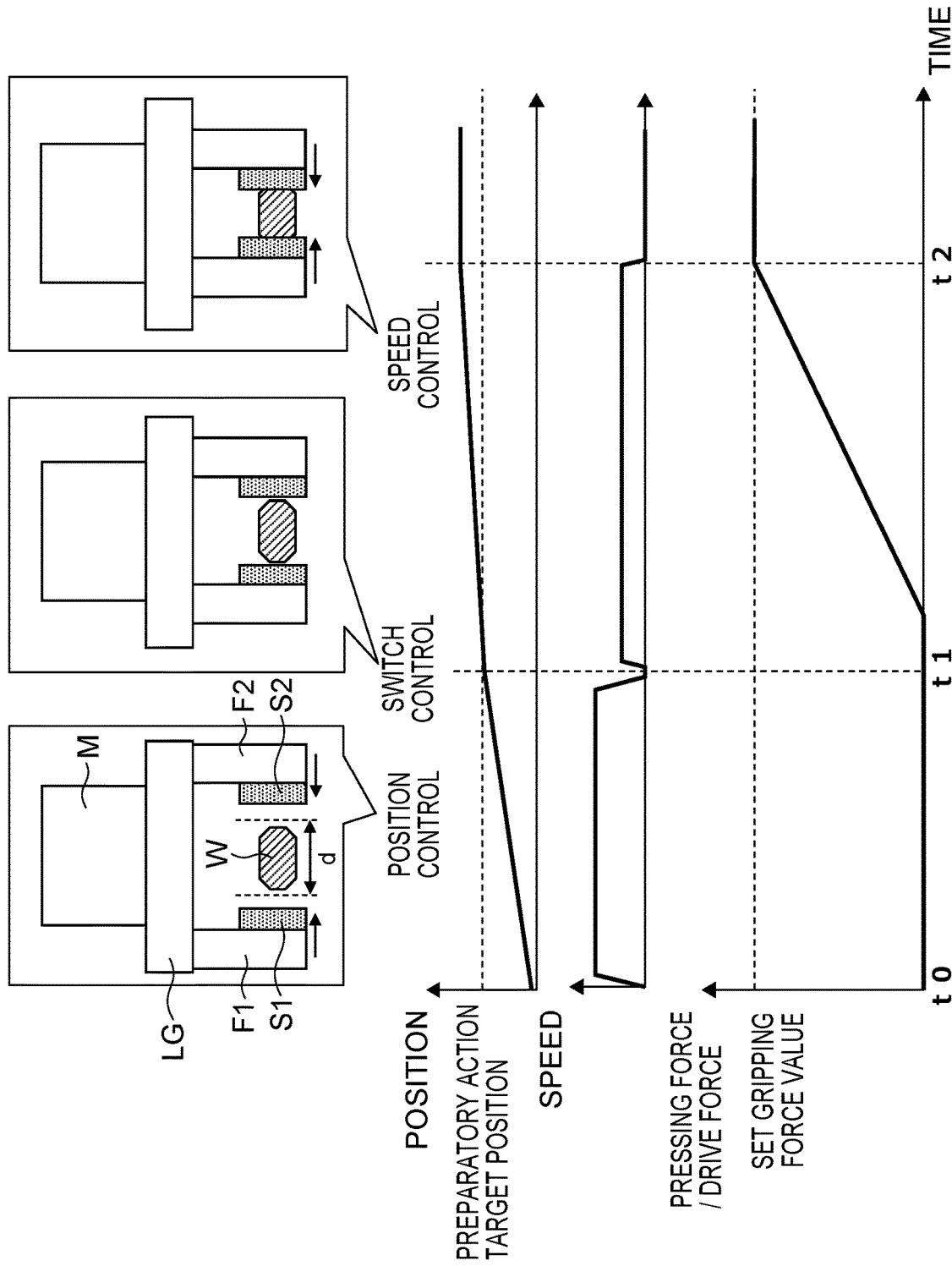
FIG. 8 is a diagram to explain a gripping action according to the first exemplary embodiment.

At step S312, the CPU 30A operates as the control section 36 and controls the motor drive section 42 such that the fingers F1, F2 of the gripper GR are moved and the gripping action to grip the workpiece W is continued. More specifically, as illustrated in FIG. 8, a switch is made from position control to speed control at the point in time t1 when the preparatory action of step S300 has ended, and an instructed speed value is output to the motor drive section 42. The motor M accordingly rotates in the forward direction so as to close the fingers F1, F2. Then as illustrated in FIG. 8, from the point in time t1 when the fingers F1, F2 are moved so as to close and contact the workpiece W, the pressing force Ps computed at step S306 or the drive force Pi computed at step S308, gradually rises. Due to flexibility of the tactile sensors S1, S2 or of the fingers F1, F2, bases of the fingers F1, F2 are anticipated to still move after the fingers F1, F2 have contacted the workpiece W. Moreover, movement of the fingers F1, F2 also occurs accompanying compression of the workpiece W under the gripping force when the workpiece W is soft. Then when the pressing force Ps computed at step S306 or the drive force Pi computed at step S308 has reached the set gripping force value at a point in time t2, the determination at step S310 of FIG. 7 becomes affirmative determination, and processing transitions to step S314.

At step S314, the CPU 30A operates as the control section 36, and controls the motor drive section 42 such that the gripped state of the workpiece W by the fingers F1, F2 is maintained. Namely, zero is output as the instructed speed value to the motor drive section 42 so as to lock the position of the fingers F1, F2. The speed control is thereby halted, and the position of the fingers F1, F2 is fixed.

At step S316, the CPU 30A operates as the control section 36 to control the robot arm AR and the motor drive section 42 so as to place the workpiece W at a predetermined position, and so as to then return the gripper GR to a predetermined initial position.

Thus when the instructed drive force i is a force anticipated in design as a force imparted by fingers F1, F2 to the workpiece W in cases in which the motor M has been driven by a given value of the instructed current value, the first error Eg is a difference in magnitude between the drive force Pi computed based on a detected drive current value and the instructed drive force i, and the second error Es is the difference in magnitude between the reaction force corresponding to the computed pressing force Ps and the instructed drive force i, whichever of the drive force Pi or the pressing force Ps corresponds to the smaller error, from out of the first error Eg or the second error Es when the instructed drive force i has become the set gripping force value, is determined to be employed to control the gripping force in the present exemplary embodiment.

The gripping force is then controlled by employing the value of whichever out of the drive force or the pressing force corresponds to the smaller error from out of the first error Eg and the second error Es as identified by the set gripping force value being greater or less than the switch value. This thereby enables exact control of the gripping force even in a region in which the gripping force of the gripper GR is small.

Moreover, due to the fingers F1, F2 being driven under position control as the preparatory action, the fingers F1, F2 can be moved at high speed to the position just ahead of contacting the workpiece W, as illustrated in FIG. 8, thereby enabling gripping of the workpiece W to be performed at high speed.

Note that for a first workpiece W, the fingers F1, F2 may be moved slowly in the preparatory action until contacting the workpiece W, and a position where contact with the workpiece W is detected may be set as the preparatory action target position for the next workpiece W.

Second Exemplary Embodiment

Next, description follows regarding a second exemplary embodiment. Note that the same reference numerals will be appended to the same portions to those of the first exemplary embodiment and detailed explanation thereof will be omitted.

In the second exemplary embodiment description follows regarding another example of a gripping action at step S312 of FIG. 7. The configuration of a gripping force control device 30, the processing of FIG. 5 and FIG. 6, and the processing other than step S312 of FIG. 7, are the same as those of the first exemplary embodiment, and so explanation thereof will be omitted.

Figure 9:
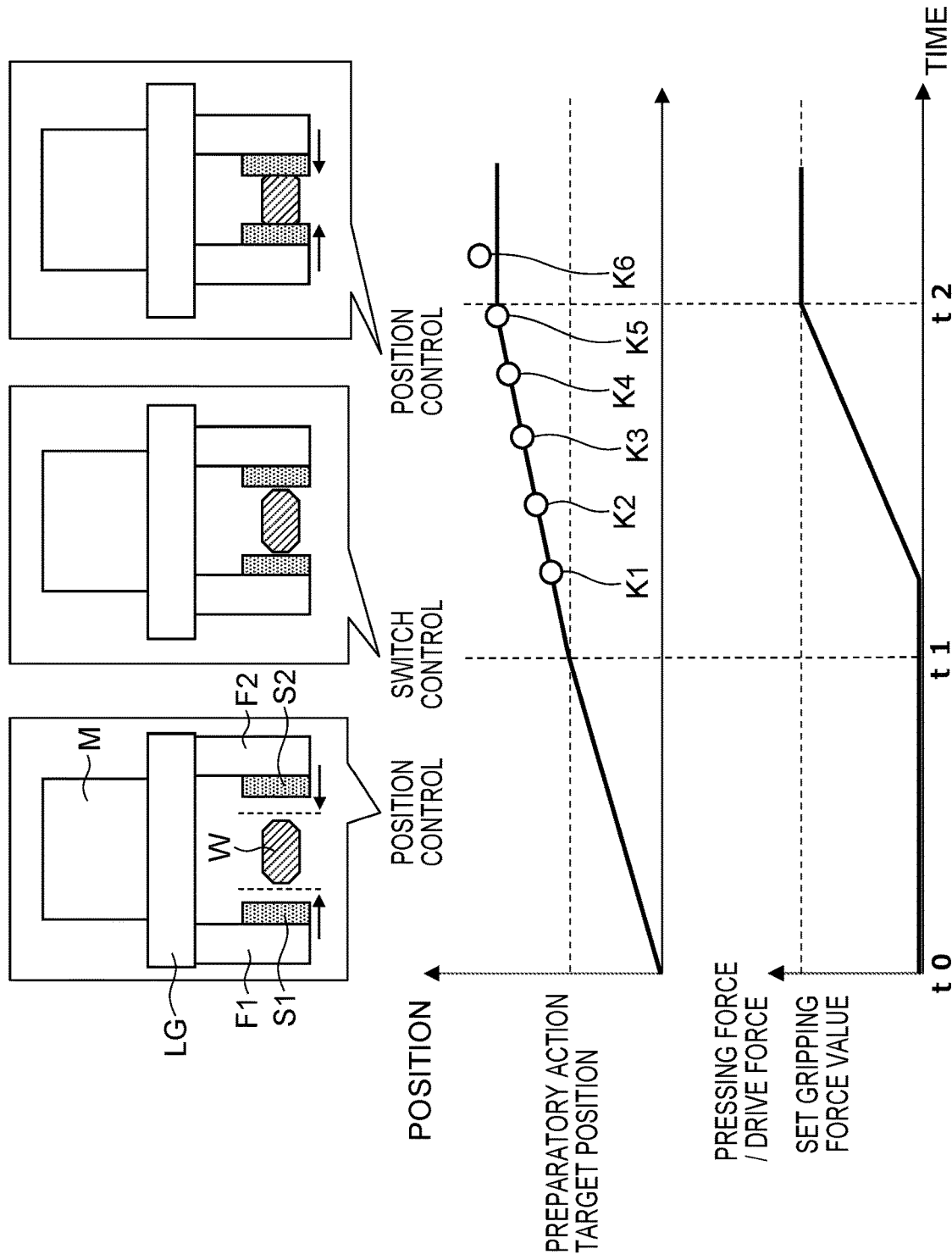
FIG. 9 is a diagram to explain a gripping action according to according to the second exemplary embodiment.

In the present exemplary embodiment, at step S312 of FIG. 7, as illustrated in FIG. 9, from a time point t1 when the preparatory action of the step S300 has ended, the target position of position control is switched in small steps and the position of the fingers F1, F2 is controlled. From the time point t1, when the fingers F1, F2 are moved so as to close and contact the workpiece W, the pressing force Ps computed at step S306 or the drive force Pi computed step S308 gradually rises. Then at a time point t2 when the pressing force Ps computed at step S306 or the drive force Pi computed step S308 has reached the set gripping force value, affirmative determination is made for the determination at step S310 of FIG. 7, and processing transitions to step S314. In the example of FIG. 9, a target position, an instructed speed value, and an instructed acceleration value are output to the motor drive section 42 so that the fingers F1, F2 pass sequentially through a series of stepwise set target positions K1 to K6. However, the pressing force Ps or the drive force Pi has reached the set gripping force value when the fingers F1, F2 have moved to the target position K5, and so movement of the target position to K6 is not executed. The fingers F1, F2 are thereby moved so as to close stepwise from the time point t1, and the workpiece W is gripped.

In this manner, in the present exemplary embodiment the target position is switched in small steps and the fingers F1, F2 are controlled so as to move stepwise and so, for example, appropriate gripping can be performed even in cases in which the workpiece W is made from an easily breakable material, such as glass for example.

Third Exemplary Embodiment

Next, description follows regarding a third exemplary embodiment. Note that the same reference numerals will be appended to the same portions to those of the first exemplary embodiment and detailed explanation thereof will be omitted.

In the third exemplary embodiment, description follows regarding other examples of the preparatory action of step S300 and the gripping action of step S312 of FIG. 7. The configuration of a gripping force control device 30, the processing of FIG. 5 and FIG. 6, and the processing other than other than step S300 and step S312 of FIG. 7, are the same as those of the first exemplary embodiment and so explanation thereof will be omitted.

In the present exemplary embodiment, the speed of the fingers F1, F2 is controlled in the preparatory action of step S300 of FIG. 7, and the fingers F1, F2 are moved until the fingers F1, F2 are detected as contacting the workpiece W. Whether or not the fingers F1, F2 have contacted the workpiece W is determined using the pressing force Ps or the drive force Pi. Namely, in cases in which the force determined at step S106 of FIG. 5 is the pressing force Ps, the pressing force Ps is computed using above Equation (2), and the fingers F1, F2 are determined to have contacted the workpiece W when the computed pressing force Ps is a predetermined contact detection level or above. Moreover, in cases in which the force determined at step S106 of FIG. 5 is the drive force Pi, the drive force Pi is computed according to above Equation (1), and the fingers F1, F2 are determined to have contacted the workpiece W when the computed drive force Pi is the predetermined contact detection level or above.

Figure 10:
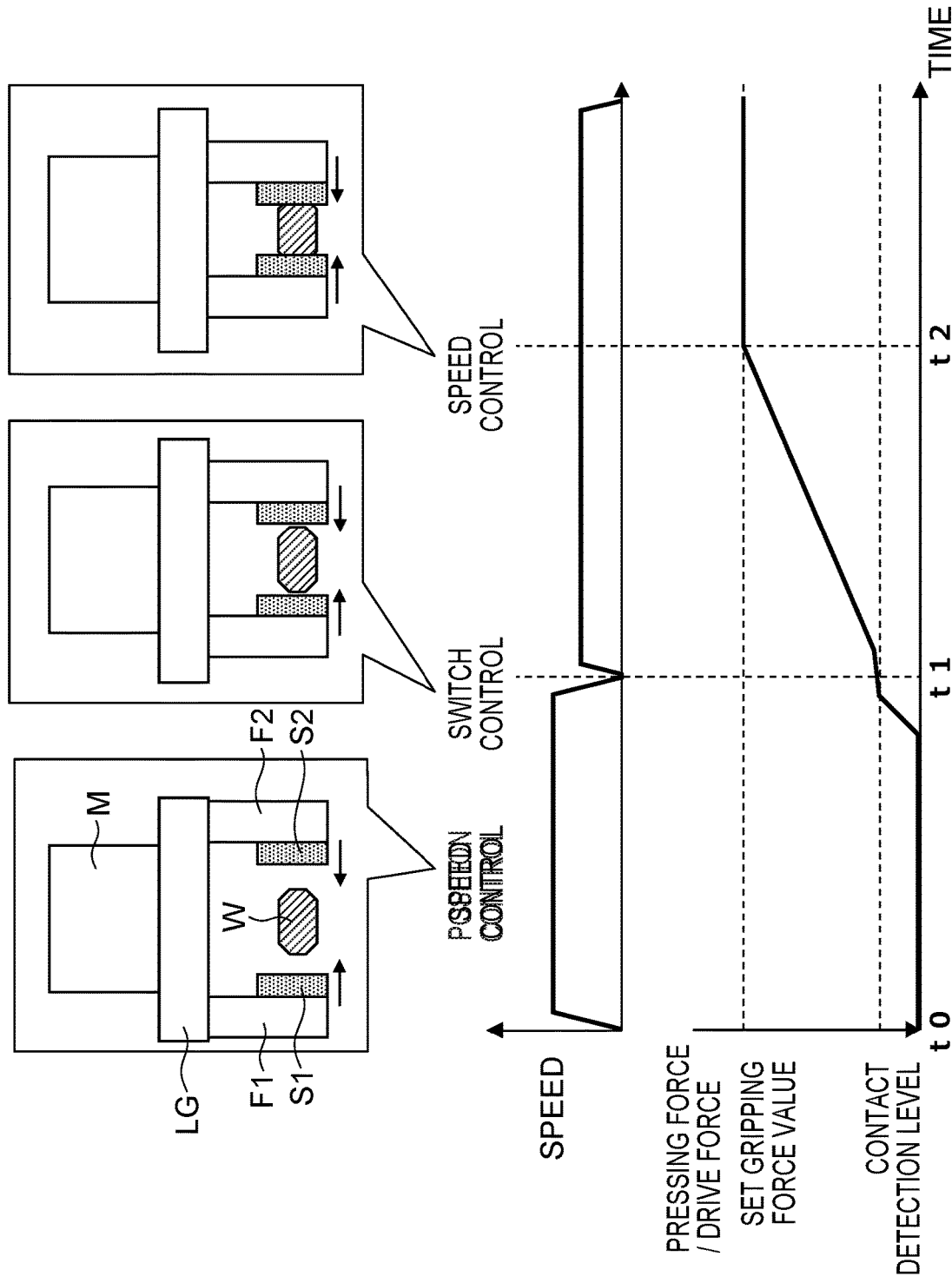
FIG. 10 is a diagram to explain a gripping action according to according to a third exemplary embodiment.

At step S312, as illustrated in FIG. 10, the fingers F1, F2 are moved so as to close by speed control with the magnitude of a target speed decreased from the time point t1 when the preparatory action of the step S300 has ended. The pressing force Ps or the drive force Pi gradually rises along with this movement. Then when at time point t2 the pressing force Ps computed at step S306 or the drive force Pi computed step S308 reaches the set gripping force value, affirmative determination is made for the determination at step S310 of FIG. 7, and processing transitions to step S314.

In this manner, in the present exemplary embodiment the fingers F1, F2 are moved by speed control during the preparatory action until they contact the workpiece W, and so there is no need to set a preparatory action target position, enabling the workpiece W to be gripped with simple control.

Note that a configuration may be adopted in which a value close to the set gripping force value that is also a value smaller than the set gripping force value is set as a threshold, and the fingers F1, F2 are controlled so as to be further slowed in speed when the computed pressing force Ps or the drive force Pi has become the threshold or greater.

Fourth Exemplary Embodiment

Next, description follows regarding a fourth exemplary embodiment. Note that the same reference numerals will be appended to the same portions to those of the first exemplary embodiment and detailed explanation thereof will be omitted.

In the fourth exemplary embodiment, description follows regarding other examples of determination of a completion condition of step S310 and of the gripping action of step S312 in FIG. 7. The configuration of a gripping force control device 30, the processing of FIG. 5 and FIG. 6, and the processing other than step S310 and step S312 of FIG. 7 are the same as those of the first exemplary embodiment, and so explanation thereof will be omitted.

Figure 11:
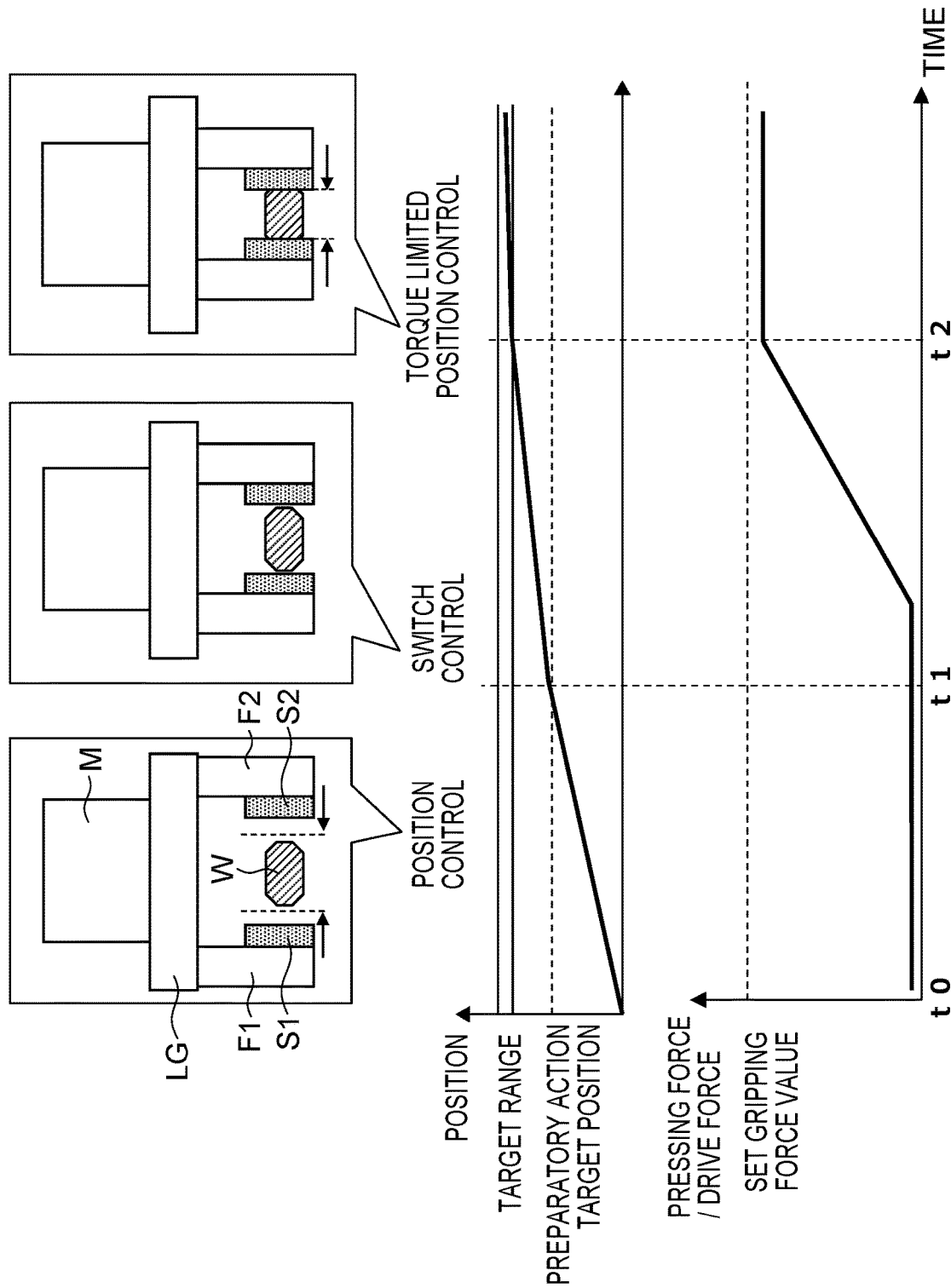
FIG. 11 is a diagram to explain a gripping action according to according to a fourth exemplary embodiment.

In the present exemplary embodiment, at step S312 of FIG. 7, from the time point t1 when the preparatory action of the step S300 has ended, positions of the fingers F1, F2 are moved so as to be within a target range by torque limited position control, as illustrated in FIG. 11. The target range is, for example, a range set centered on a predetermined target position, with a margin either side. Namely, for example, the target range is A±α in cases in which the target position is A, and the margin is α.

The completion condition of step S310 is that the pressing force Ps or the drive force Pi has reached the set gripping force value as a first condition, and that the positions of the fingers F1, F2 are included in the target range as a second condition. Then the completion condition is taken as being satisfied when at least one out of the first condition or the second condition has been satisfied. In the example illustrated in FIG. 11, because the second condition is fulfilled, the pressing force Ps or the drive force Pi do not reach the set gripping force value after gripping completion. In a separate example, suppose that the first condition is fulfilled, then the position of the fingers F1, F2 would not reach the target range after gripping completion.

In this manner, due to the completion condition being satisfied also in cases in which the position of the fingers F1, F2 is within the target range, the workpiece W can be gripped appropriately even in cases in which, for example, the workpiece W is soft and there is a desire to not compress the dimensions of the workpiece W too much.

Fifth Exemplary Embodiment

Next, description follows regarding the fifth exemplary embodiment. Note that the same reference numerals will be appended to the same portions to those of the first exemplary embodiment and detailed explanation thereof will be omitted.

In the fifth exemplary embodiment description follows regarding a case in which an abnormality of the tactile sensors S1, S2 is determined. The configuration of a gripping force control device 30, and the processing of FIG. 6 and FIG. 7, are the same as those of the first exemplary embodiment and detailed explanation thereof will be omitted.

Figure 12:
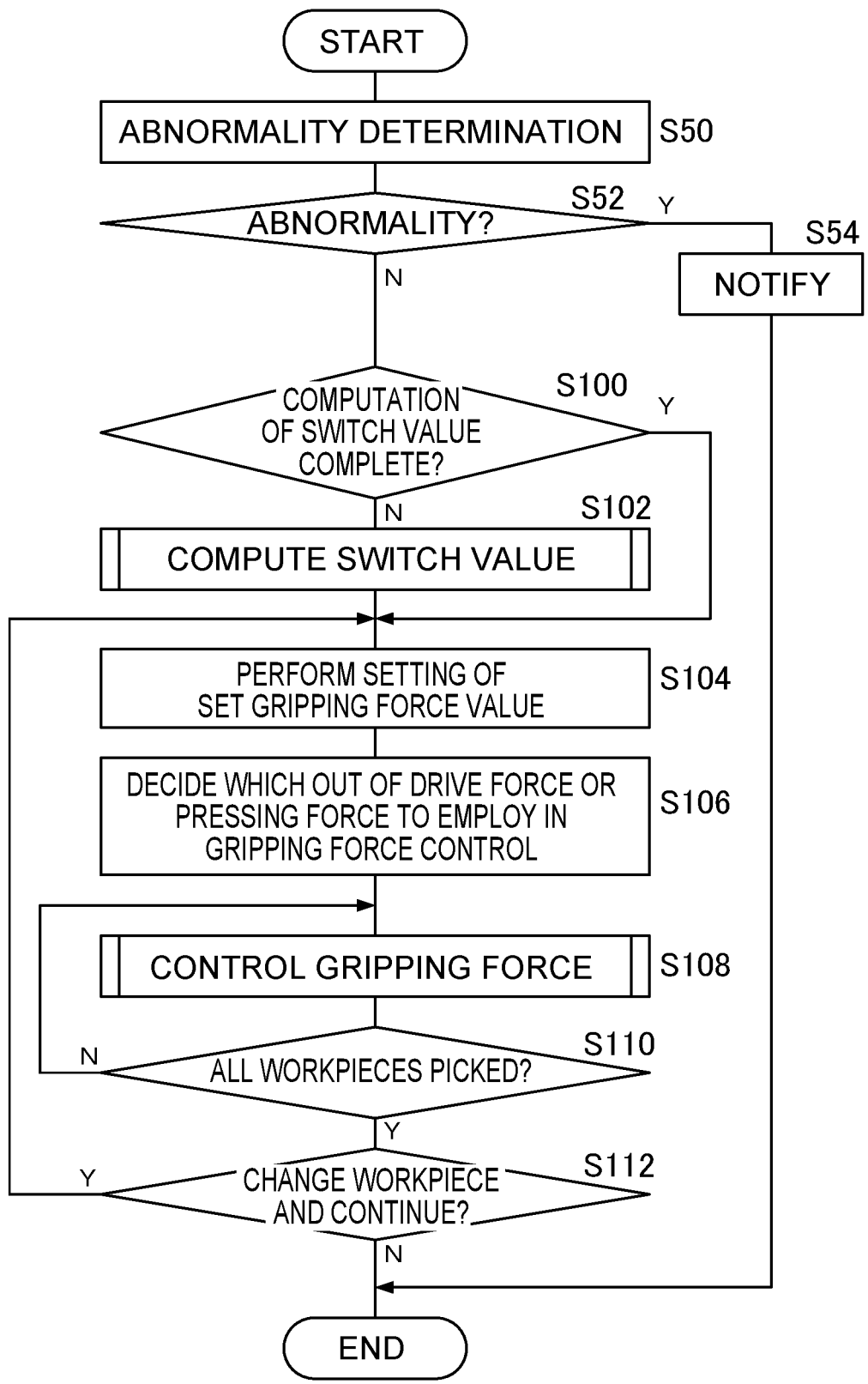
FIG. 12 is a flowchart illustrating a flow of a main routine of gripping force control processing according to a fifth exemplary embodiment.

FIG. 12 illustrates a flowchart of gripping force control processing according to the present exemplary embodiment. The gripping force control processing illustrated in FIG. 12 is different from the gripping force control processing illustrated in FIG. 5 in that processing of steps S50 to S54 has been added.

As illustrated in FIG. 12, at step S50 the CPU 30A operates as the control section 36 and determines whether or not there is an abnormality in the tactile sensors S1, S2.

More specifically, the fingers F1, F2 are driven between an open state of the fingers F1, F2 and a closed state thereof, time series are acquired for the position of the gripper GR, the drive force Pi, and the pressing force Ps, and determination is made as to whether or not a difference between the drive force Pi and the pressing force Ps for the same clock time is outside a permissible range.

Then determination is made that there is an abnormality in at least one out of the tactile sensors S1, S2 in cases in which the difference between the drive force Pi and the pressing force Ps is outside the permissible range. Note that a configuration may be adopted in which a region less than a lower limit value of the gripping force range in the gripper product specification is not subjected to abnormality determination.

At step S52, the CPU 30A operates as the control section 36 and determines whether or not an abnormality has been determined for at least one out of the tactile sensors S1, S2 at step S50, and then processing transitions to step S54 in cases in which an abnormality was determined, and processing transitions to step S100 in cases in which no abnormality was determined.

At step S54, a message indicating that there was an abnormality in at least one out of the tactile sensors S1, S2 at step S50 is notified, such as by display on the monitor 30F or the like. This thereby enables an operator to ascertain that an abnormality has occurred in at least one out of the tactile sensors S1, S2, enabling gripping force control to be prevented from being performed when an abnormality has occurred.

Sixth Exemplary Embodiment

Next, description follows regarding the sixth exemplary embodiment. Note that the same reference numerals will be appended to the same portions to those of the fifth exemplary embodiment and detailed explanation thereof will be omitted.

In the sixth exemplary embodiment description follows regarding another example of determining an abnormality of the tactile sensors S1, S2. The configuration of a gripping force control device 30, the processing of FIG. 6 and FIG. 7, and the processing other than step S50 of FIG. 12, are the same as those of the fifth exemplary embodiment and explanation thereof will be omitted.

In the present exemplary embodiment, at step S50 of FIG. 12 the fingers F1, F2 are driven between an open state of the fingers F1, F2 and a closed state thereof, a time series is acquired for the pressing force Ps, and when determining an abnormality, determination is made as to whether or not a difference between the pressing force Ps acquired and the pressing force Ps acquired in the past for the same position of the fingers F1, F2, is outside the permissible range by comparison to a predetermined threshold. Determination is made that there is an abnormality with at least one out of the tactile sensors S1, S2 when outside the permissible range. Note that the pressing force Ps acquired at abnormality determination may be stored in the storage 30D, and then employed for the next abnormality determination.

Performing abnormality determination on the tactile sensors S1, S2 in this manner thereby enables the operator to ascertain when an abnormality has occurred in at least one out of the tactile sensors S1, S2, enabling gripping force control to be prevented from being performed when an abnormality has occurred.

Seventh Exemplary Embodiment

Next, description follows regarding a seventh exemplary embodiment. Note that the same reference numerals will be appended to the same portions to those of the fifth exemplary embodiment and detailed explanation thereof will be omitted.

In the seventh exemplary embodiment description follows regarding another example of determining an abnormality of the tactile sensors S1, S2. The configuration of a gripping force control device 30, the processing of FIG. 6 and FIG. 7, and the processing other than step S50 of FIG. 12 are the same as those of the fifth exemplary embodiment and so explanation thereof will be omitted.

Figure 13:
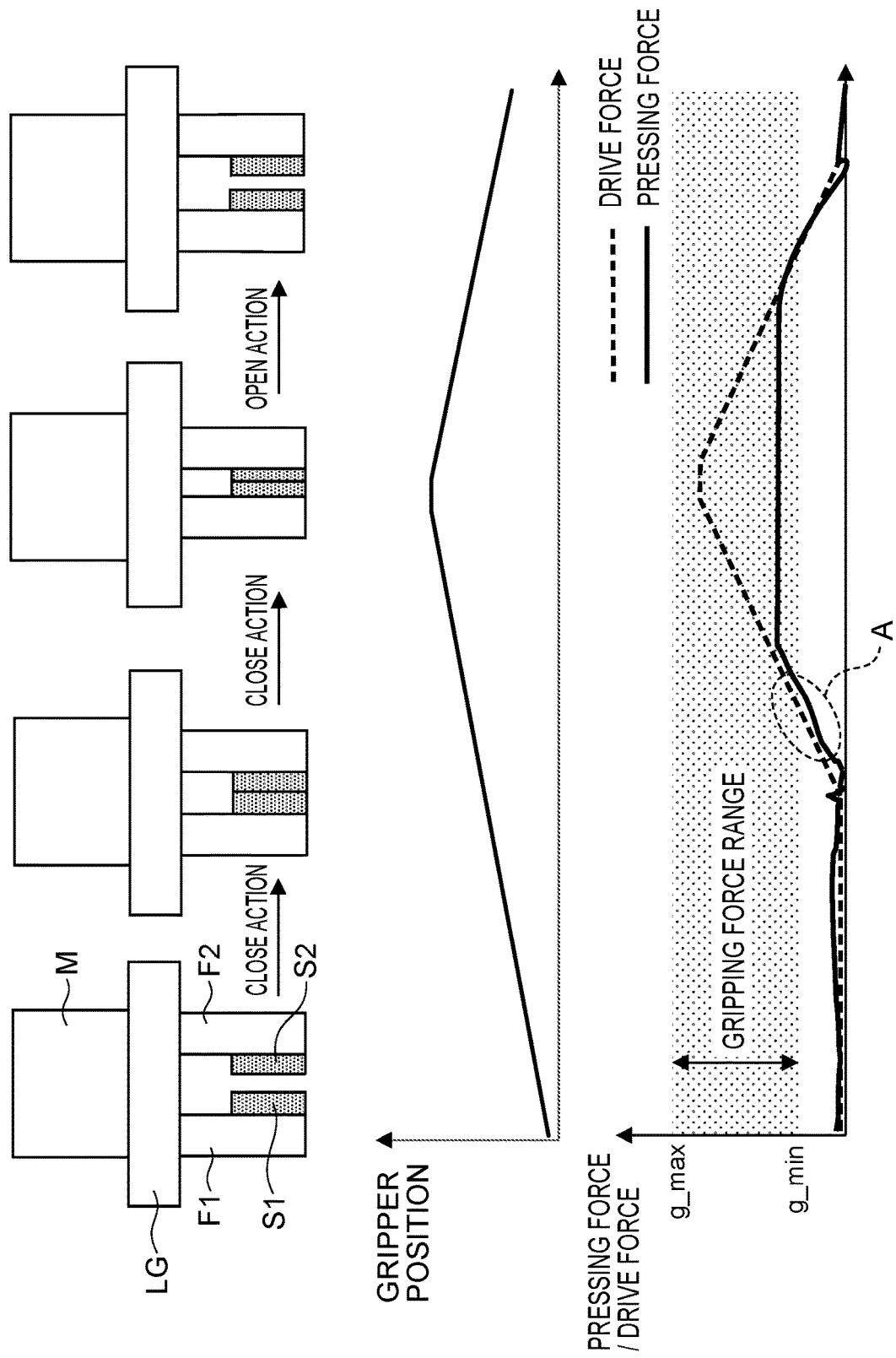
FIG. 13 is a diagram to explain abnormality determination processing of a tactile sensor.

In the present exemplary embodiment at step S50 of FIG. 12, a lower limit value g_min is acquired for a gripping force range in the gripper product specification. The gripping force range lower limit value g_min is, for example, pre-stored in the storage 30D. Then an abnormality is determined in cases in which a detection value of the tactile sensors S1, S2 that should occur by the fingers F1, F2 being closed is not able to be acquired when the fingers F1, F2 are driven at less than the gripping force range lower limit value g_min in the gripper product specification for the closed state of the fingers F1, F2. More specifically, as illustrated in FIG. 13, the instructed drive force i is gradually increased in the range of less than the gripping force range lower limit value g_min. The pressing force Ps of the tactile sensors S1, S2 should accordingly gradually rise in the range A of less than the gripping force range lower limit value g_min when the tactile sensors S1, S2 are operating normally, however a detection value is not able to be acquired when there is an abnormality with the tactile sensors S1, S2. This means that an abnormality is determined when the pressing force Ps has not gradual risen accompanying the case in which the instructed drive force i is gradual increased in the range of less than the gripping force range lower limit value g_min.

Eighth Exemplary Embodiment

Next, description follows regarding an eighth exemplary embodiment. Note that the same reference numerals will be appended to the same portions to those of the fifth exemplary embodiment and detailed explanation thereof will be omitted.

In the eighth exemplary embodiment description follows regarding an example of determining an abnormality of the tactile sensors S1, S2. The configuration of a gripping force control device 30, the processing of FIG. 6 and FIG. 7, and the processing other than step S50 of FIG. 12 are the same as those of the fifth exemplary embodiment and so explanation thereof will be omitted.

In the present exemplary embodiment, at step S50 of FIG. 12, the CPU 30A operates as the control section 36 and acquires the gripping force range lower limit value g_min in the gripper product specification and the minimum detection value in the tactile sensor S1, S2 specification. Determination is then made as to whether or not a pressing force Ps corresponding to the minimum detection value of the tactile sensors S1, S2 is the gripping force range lower limit value g_min in the gripper product specification or greater, and an abnormality is determined in cases in which the pressing force Ps corresponding to the minimum detection value of the tactile sensors S1, S2 is the gripping force range lower limit value g_min in the gripper product specification or greater. Namely, an abnormality is determined in cases in which the tactile sensors S1, S2 are unable to detect a detection value corresponding to a pressing force of less than gripping force range lower limit value g_min in the gripper product specification.

The above exemplary embodiments are merely described to give examples of the configuration of the present disclosure. The present disclosure is not limited to the specific embodiments described above, and various modifications thereto are possible within a range of technology conceivable therefrom.

Note that although the gripping force control processing was executed by a CPU reading software (a program) in each of the above exemplary embodiments, the gripping force control processing may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The gripping force control processing may be executed by any one of these various types of processor, or may be executed by a combination of two or more of the same type or different types of processor (such as plural FPGAs, or a combination of a CPU and an FPGA). The hardware structure of these various types of processor is more specifically an electric circuit combining circuit elements such as semiconductor elements.

Moreover, although embodiments have been described for each of the above exemplary embodiments in which a gripping force control program is pre-stored (installed) in the storage 30D or the ROM 30B, there is no limitation thereto. The program may be provided in a format recorded on a recording medium such as a compact disk read only memory (CD-ROM), a digital versatile disk read only memory (DVD-ROM), a universal serial bus (USB) memory, or the like. The program may also be provided in a format downloadable from an external device over a network.

Note that the entire disclosure of Japanese Patent Application No. 2020-203481 is incorporated in the present specification by reference herein. Moreover, all publications, patent applications and technical standards mentioned in the present specification are incorporated by reference in the present specification to the same extent as if each individual publication, patent application, or technical standard was specifically and individually indicated to be incorporated by reference.

EXPLANATION OF THE REFERENCE NUMERALS 10 robot system
20 robot
gripping force control device
32 drive force computation section 34 pressing force computation section
36 control section
40 drive current detection section
42 motor drive section
44 speed detection section
F1, F2 finger
GR gripper
M motor
S1, S2 tactile sensor
W workpiece

The invention claimed is:

1. A robot, comprising:

a gripper including a plurality of fingers that grip a target object, a motor that drives at least one finger of the plurality of fingers as a drive finger, a drive current detection section that detects a drive current of the motor, and a tactile sensor that is provided at a tactile finger that is at least one finger of the plurality of fingers;

a drive force computation section that computes a drive force that the drive finger is imparting to the target object based on a drive current value of the motor detected by the drive current detection section;

a pressing force computation section that computes a pressing force that the tactile sensor is receiving from the target object based on a detection value of the tactile sensor; and a control section that determines which of the drive force or the pressing force to employ based on a gripping force set value that is a setting value of gripping force that the drive finger or the tactile finger is to impart to the target object, and that controls the gripping force employing a value of whichever of the drive force or the pressing force was determined to be employed, wherein:

a force anticipated as a force for the drive finger to impart to the target object, in a case in which an instructed current value of a given value has been issued and the motor driven, is taken as an instructed drive force, a magnitude of a difference between the drive force computed based on the detected drive current value and the instructed drive force is taken as a first error, and a magnitude of a difference between a reaction force corresponding to the computed pressing force and the instructed drive force is taken as a second error; and in order to control the gripping force, the control section determines to employ the drive force or the pressing force that corresponds to a smallest error among the first error or the second error when the instructed drive force is configured as the gripping force set value.

2. The robot of claim 1, wherein:

the instructed drive force, at which a magnitude relationship between the first error and the second error switches, is taken as a switch value; and the control section controls the gripping force by employing a value of whichever of the drive force or the pressing force corresponds to a smaller error among the first error and the second error as identified by the gripping force set value being larger or smaller than the switch value.

3. A gripping force control device connected to a gripper of a robot that includes a plurality of fingers that grip a target object, a motor that drives at least one finger of the plurality of fingers as a drive finger, a drive current detection section that detects a drive current of the motor, and a tactile sensor that is provided at a tactile finger that is at least one finger of the plurality of fingers, the gripping force control device controlling a gripping force imparted to the target object by the drive finger or the tactile finger and comprising:

a drive force computation section that computes a drive force being imparted to the target object by the drive finger based on a drive current value of the motor detected by the drive current detection section;

a pressing force computation section that computes a pressing force that the tactile sensor is receiving from the target object based on a detection value of the tactile sensor; and a control section that determines which of the drive force or the pressing force to employ based on a gripping force set value that is a setting value of the gripping force, and that controls the gripping force employing a value of whichever of the drive force or the pressing force was determined to be employed, wherein:

a force anticipated as a force for the drive finger to impart to the target object, in a case in which an instructed current value of a given value has been issued and the motor driven, is taken as an instructed drive force, a magnitude of a difference between the drive force computed based on the detected drive current value and the instructed drive force is taken as a first error, and a magnitude of a difference between a reaction force corresponding to the computed pressing force and the instructed drive force is taken as a second error; and in order to control the gripping force, the control section determines to employ the drive force or the pressing force that corresponds to a smallest error among the first error or the second error when the instructed drive force is configured as the gripping force set value.

4. The gripping force control device of claim 3, wherein:

the instructed drive force, at which a magnitude relationship between the first error and the second error switches, is taken as a switch value; and the control section controls the gripping force by employing a value of whichever of the drive force or the pressing force corresponds to a smaller error among the first error and the second error as identified by the gripping force set value being larger or smaller than the switch value.

5. The gripping force control device of claim 3, wherein:

the control section moves the drive finger by controlling a position of the drive finger until the plurality of fingers are at positions immediately prior to gripping the target object, and then controls so as to move the drive finger until a magnitude of the drive force or the pressing force being employed to control the gripping force has become the gripping force set value.

6. The gripping force control device of claim 5, wherein the control section effects control to move the drive finger so as to sequentially pass through a series of target positions that are configured stepwise, and then effects control so as to move the drive finger until a magnitude of the drive force or the pressing force being employed to control the gripping force becomes the gripping force set value.

7. The gripping force control device of claim 3, wherein:

the control section effects control by controlling a speed of the drive finger to move the drive finger until the drive finger is detected as contacting the target object, and then effects control so as to move the drive finger until a magnitude of the drive force or the pressing force being employed to control the gripping force becomes the gripping force set value.

8. The gripping force control device of claim 3, wherein:

the control section effects control by controlling a position of the drive finger so as to move the drive finger until the plurality of fingers are at a preparatory action target position immediately prior to of gripping the target object, and then effects control so as to move the drive finger to within a target range or to move the drive finger until a magnitude of the drive force or the pressing force being employed to control the gripping force has become the gripping force set value.

9. The gripping force control device of claim 3, wherein the control section drives the drive finger between an open state and a closed state of the plurality of fingers, acquires time series of a position of the gripper, the drive force, and the pressing force, and provides notification when a difference between the drive force and the pressing force is outside a permissible range.

10. The gripping force control device of claim 3, wherein:
the control section drives the drive finger between an open state and a closed state of the plurality of fingers, acquires the pressing force as a time series, and provides notification in cases in which a difference between the acquired pressing force and the pressing force acquired in the past is outside a permissible range.

11. The gripping force control device of claim 3, wherein:
the gripper includes a gripper product with defined specifications for a gripping force range, the gripper product being equipped with the plurality of fingers, the motor, and the drive current detection section; and
the control section acquires a lower limit value of the gripping force range in the specifications of the gripper product, and provides notification in cases in which the control section is not able to acquire a detection value of the tactile sensor, which should rise as a result of the plurality of fingers being closed when the drive finger has been driven at less than the lower limit value of the gripping force range in the specifications of the gripper product in a closed state of the plurality of fingers.

12. The gripping force control device of claim 3, wherein:
the gripper includes a gripper product with defined specifications for a gripping force range, the gripper product being equipped with the plurality of fingers, the motor, and the drive current detection section;
the tactile sensor is configured with defined specifications for a minimum detection value that is detectable; and
the control section acquires a lower limit value of the gripping force range in the specifications of the gripper product and a minimum detection value in the specifications of the tactile sensor, and provides notification in cases in which the pressing force corresponding to the minimum detection value is equal to or higher than the lower limit value of the gripping force range in the specifications of the gripper product.

13. A gripping force control method in a gripping force control device connected to a gripper of a robot that includes a plurality of fingers that grip a target object, a motor that drives at least one finger of the plurality of fingers as a drive finger, a drive current detection section that detects a drive current of the motor, and a tactile sensor that is provided at a tactile finger that is at least one finger of the plurality of fingers, and that controls a gripping force imparted to the target object by the drive finger or the tactile finger, the gripping force control method comprising:
computing a drive force that the drive finger is imparting to the target object based on a drive current value of the motor detected by the drive current detection section;
computing a pressing force that the tactile sensor is receiving from the target object based on a detection value of the tactile sensor;

determining which of the drive force or the pressing force to employ based on a gripping force set value that is a setting value of the gripping force; and
controlling the gripping force employing a value of whichever of the drive force or the pressing force was determined to be employed, wherein:
a force anticipated as a force for the drive finger to impart to the target object, in a case in which an instructed current value of a given value has been issued and the motor driven, is taken as an instructed drive force, a magnitude of a difference between the drive force computed based on the detected drive current value and the instructed drive force is taken as a first error, and a magnitude of a difference between a reaction force corresponding to the computed pressing force and the instructed drive force is taken as a second error; and
in order to control the gripping force, the control section determines to employ the drive force or the pressing force that corresponds to a smallest error among the first error or the second error when the instructed drive force is configured as the gripping force set value.

14. The gripping force control method of claim 13, wherein:
the instructed drive force, at which a magnitude relationship between the first error and the second error switches, is taken as a switch value; and
the control section controls the gripping force by employing a value of whichever of the drive force or the pressing force corresponds to a smaller error among the first error and the second error as identified by the gripping force set value being larger or smaller than the switch value.

15. A non-transitory recording medium storing a gripping force control program in a gripping force control device connected to a gripper of a robot that includes a plurality of fingers that grip a target object, a motor that drives at least one finger of the plurality of fingers as a drive finger, a drive current detection section that detects a drive current of the motor, and a tactile sensor that is provided at a tactile finger that is at least one finger of the plurality of fingers, and that controls a gripping force imparted to the target object by the drive finger or the tactile finger, the gripping force control program causing a computer to execute processing comprising:
computing a drive force that the drive finger is imparting to the target object based on a drive current value of the motor detected by the drive current detection section;
computing a pressing force that the tactile sensor is receiving from the target object based on a detection value of the tactile sensor;
determining which of the drive force or the pressing force to employ based on a gripping force set value that is a setting value of the gripping force; and
controlling the gripping force employing a value of whichever of the drive force or the pressing force was determined to be employed, wherein:
a force anticipated as a force for the drive finger to impart to the target object, in a case in which an instructed current value of a given value has been issued and the motor driven, is taken as an instructed drive force, a magnitude of a difference between the drive force computed based on the detected drive current value and the instructed drive force is taken as a first error, and a magnitude of a difference between a reaction force corresponding to the computed pressing force and the instructed drive force is taken as a second error; and in order to control the gripping force, the control section determines to employ the drive force or the pressing force that corresponds to a smallest error among the first error or the second error when the instructed drive force is configured as the gripping force set value.

16. The non-transitory recording medium of claim 15, wherein:

the instructed drive force, at which a magnitude relationship between the first error and the second error switches, is taken as a switch value; and the control section controls the gripping force by employing a value of whichever of the drive force or the pressing force corresponds to a smaller error among the first error and the second error as identified by the gripping force set value being larger or smaller than the switch value.

* * * * *